(12) United States Patent
Kitano

(10) Patent No.: US 12,244,951 B2
(45) Date of Patent: Mar. 4, 2025

(54) IMAGING DEVICE AND IMAGING METHOD

(71) Applicant: SONY SEMICONDUCTOR SOLUTIONS CORPORATION, Kanagawa (JP)

(72) Inventor: Shin Kitano, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 129 days.

(21) Appl. No.: 18/003,358

(22) PCT Filed: Jun. 22, 2021

(86) PCT No.: PCT/JP2021/023684
§ 371 (c)(1),
(2) Date: Dec. 27, 2022

(87) PCT Pub. No.: WO2022/004502
PCT Pub. Date: Jan. 6, 2022

(65) Prior Publication Data
US 2023/0247323 A1    Aug. 3, 2023

(30) Foreign Application Priority Data

Jul. 2, 2020 (JP) .................................. 2020-114996

(51) Int. Cl.
*H04N 25/76* (2023.01)
*H04N 25/534* (2023.01)
(Continued)

(52) U.S. Cl.
CPC ......... *H04N 25/768* (2023.01); *H04N 25/534* (2023.01); *H04N 25/773* (2023.01)

(58) Field of Classification Search
CPC ... H04N 25/768; H04N 25/773; H04N 25/534
See application file for complete search history.

(56) References Cited

U.S. PATENT DOCUMENTS 8,331,713 B2 * 12/2012 Shiraki ..................... G06T 5/73
396/89
12,052,507 B2 * 7/2024 Ota ........................ H04N 25/57

FOREIGN PATENT DOCUMENTS

JP    2016-533140 A    10/2016
JP    2017-535999 A    11/2017
(Continued)

OTHER PUBLICATIONS

International Search Report and Written Opinion of PCT Application No. PCT/JP2021/023684, issued on Sep. 14, 2021, 08 pages of ISRWO.

*Primary Examiner* — Twyler L Haskins
*Assistant Examiner* — Fayez A Bhuiyan
(74) *Attorney, Agent, or Firm* — CHIP LAW GROUP

(57) ABSTRACT

To output event information at high sensitivity and high speed with a simple configuration. An imaging device includes: a plurality of pixels each having a plurality of photoelectric conversion elements that photoelectrically converts incident light to generate an electric signal; a detecting section that outputs a detection signal in a case where an absolute value of a change amount of the electric signal in a pixel of the plurality of pixels exceeds a predetermined threshold; a signal processing section that performs predetermined signal processing on the basis of the detection signal output from the detecting section; an AZ output section that outputs an auto-zero signal for initializing the detecting section; a time code generator that outputs a time code changing at a predetermined cycle; a first holding circuit that holds the time code output from the time code generator when the auto-zero signal is output; a second holding circuit that holds the time code output from the time code generator when the detection signal is output; and a transfer section that transfers the time code held in the first (Continued)

holding circuit and the time code held in the second holding circuit to the signal processing section in association with each other.

16 Claims, 20 Drawing Sheets

(51) Int. Cl.
*H04N 25/768* (2023.01)
*H04N 25/773* (2023.01)

(56) References Cited

FOREIGN PATENT DOCUMENTS

| | | |
|---|---|---|
| JP | 2020-048066 A | 3/2020 |
| JP | 2020-088425 A | 6/2020 |
| JP | 2020-088724 A | 6/2020 |
| WO | 2019/239722 A1 | 12/2019 |

* cited by examiner

2: IMAGING SYSTEM

35: ADDRESS EVENT DETECTING SECTION

IMAGING DEVICE AND IMAGING METHOD

CROSS REFERENCE TO RELATED APPLICATIONS

This application is a U.S. National Phase of International Patent Application No. PCT/JP2021/023684 filed on Jun. 22, 2021, which claims priority benefit of Japanese Patent Application No. JP 2020-114996 filed in the Japan Patent Office on Jul. 2, 2020. Each of the above-referenced applications is hereby incorporated herein by reference in its entirety.

TECHNICAL FIELD

The present disclosure relates to an imaging device and an imaging method.

BACKGROUND ART

There is known an imaging device that acquires data of a portion in which a luminance level has changed due to a certain event only when the event occurs in an imaging scene (see Patent Document 1). This type of imaging device may be referred to as an event base vision sensor (EVS).

In addition, there is also known an imaging device that outputs not only event information but also a luminance value (see Patent Document 2).

CITATION LIST

Patent Documents

Patent Document 1: Japanese Patent Application Laid-Open No. 2017-535999
Patent Document 2: Japanese Patent Application Laid-Open No. 2016-533140

SUMMARY OF THE INVENTION

Problems to be Solved by the Invention

Under a situation where flicker occurs, since a plurality of pixels detects an event almost simultaneously, it takes time to process the detected event. In addition, in a case where the event information and the luminance value are output together, since it is necessary to read the luminance value at a high speed, there is a possibility that the photoelectric conversion performance in the dark is deteriorated.

There is known an imaging device in which an analog-digital converter is provided for every pixel to enable a luminance value to be output at high speed. However, if an attempt is made to output the luminance value and the event information in association with each other in this type of imaging device, the configuration of the imaging device may be complicated.

Therefore, the present disclosure provides an imaging device and an imaging method capable of outputting event information with high sensitivity and high speed with a simple configuration.

Solutions to Problems

In order to solve the problem described above, according to the present disclosure, provided is an imaging device including:

a plurality of pixels each having a plurality of photoelectric conversion elements that photoelectrically converts incident light to generate an electric signal;
a detecting section that outputs a detection signal in a case where an absolute value of a change amount of the electric signal in a pixel of the plurality of pixels exceeds a predetermined threshold;
a signal processing section that performs predetermined signal processing on the basis of the detection signal output from the detecting section;
an AZ output section that outputs an auto-zero signal for initializing the detecting section;
a time code generator that outputs a time code changing at a predetermined cycle;
a first holding circuit that holds the time code output from the time code generator when the auto-zero signal is output;
a second holding circuit that holds the time code output from the time code generator when the detection signal is output; and a transfer section that transfers the time code held in the first holding circuit and the time code held in the second holding circuit to the signal processing section in association with each other.

The first holding circuit may hold the time code corresponding to the auto-zero signal for each of the plurality of pixels, and
the second holding circuit may hold the time code corresponding to the detection signal for a pixel that has output the detection signal among the plurality of pixels.

The second holding circuit may hold data for the plurality of pixels by holding predetermined data for a pixel that does not output the detection signal.

The transfer section may associate data for the plurality of pixels held by the first holding circuit with data for the plurality of pixels held by the second holding circuit, and sequentially transfer the data to the signal processing section for each pixel.

A period in which the time code corresponding to the auto-zero signals for the plurality of pixels is held in the first holding circuit, a period in which the time code corresponding to the detection signal for the plurality of pixels is held in the second holding circuit, and a period in which data held by the first holding circuit and the second holding circuit for the plurality of pixels is sequentially read for each pixel and transferred by the transfer section may be sequentially repeated.

A period in which the time code corresponding to the auto-zero signal for the plurality of pixels is held in the first holding circuit, a period in which the time code corresponding to the detection signal for the plurality of pixels is held in the second holding circuit, and a period in which the data held by the first holding circuit and the second holding circuit for the plurality of pixels is sequentially read for each pixel and transferred by the transfer section may be provided during one frame period in which data of the plurality of pixels is read.

The transfer section may include clusters in a plurality of stages connected in series that transfer the time code generated by the time code generator and sequentially transfer data held by the first holding circuit and data held by the second holding circuit for each pixel, and
each of the clusters in the plurality of stages may transfer the time code generated by the time code generator to a cluster in a subsequent stage or the signal processing section, and transfer the data held by the first holding circuit and the data held by the second holding circuit to the cluster in the subsequent stage or the signal processing section.

A cluster of the clusters in a first stage may hold the time code output from the time code generator and hold data held by the first holding circuit corresponding and data held by the second holding circuit at a same timing, and clusters of the clusters in second and subsequent stages may transfer the time code sequentially transferred from the time code generator held in a cluster in a preceding stage to a cluster in a subsequent stage or the signal processing section, transfer the data held by the first holding circuit corresponding and the data held by the second holding circuit to the cluster in the subsequent stage or the signal processing section, and transfer data held by the cluster in the preceding stage to the cluster in the subsequent stage or the signal processing section.

The transfer section may include:

first clusters in a plurality of stages that transfer the time code generated by the time code generator; and second clusters in a plurality of stages that transfer data held by the first holding circuit and data held by the second holding circuit, each of the first clusters in the plurality of stages may transfer data held by the first holding circuit corresponding and data held by the second holding circuit to a second cluster of the second clusters corresponding, and the signal processing section may receive the time code output from a first cluster of the first clusters in a final stage and receive data output from a second cluster of the second clusters in a final stage.

A first cluster of the first clusters in a first stage may hold the time code output from the time code generator, a second cluster of the second clusters in a first stage may hold data held by the first holding circuit corresponding and data held by the second holding circuit, first clusters of the first clusters in second and subsequent stages may hold the time code sequentially transferred from the time code generator held in a first cluster in a preceding stage, and second clusters of the second clusters in second and subsequent stages may transfer the data held by the first holding circuit corresponding and the data held by the second holding circuit corresponding to a second cluster of the second clusters in a subsequent stage or the signal processing section, and transfer data held by a second cluster in a preceding stage to the second cluster in the subsequent stage or the signal processing section.

A period in which the time code corresponding to the auto-zero signals for the plurality of pixels is held in the first holding circuit and a period in which the time code corresponding to the detection signal for the plurality of pixels is held in the second holding circuit may be provided during a first frame period in which data of the plurality of pixels is read, and each of the plurality of second clusters may transfer, during a second frame period following the first frame period, data held for the plurality of pixels held in the first holding circuit and data held for the plurality of pixels held in the second holding circuit during the first frame period to a second cluster in a subsequent stage or the signal processing section.

Detection processing of the detection signal for the plurality of pixels may be started asynchronously with a frame period in which data of the plurality of pixels is read, the detection signal of a pixel may be reset and the auto-zero signal may be output after the time code corresponding to the detection signal for the pixel from which the detection signal is output is held in the second holding circuit, data held by the second holding circuit may be transferred to a second cluster of the second clusters corresponding, and thereafter, the detection processing of the detection signal for the pixel may be resumed after the time code corresponding to the auto-zero signal is held in the first holding circuit.

Each of the plurality of pixels may include an analog-digital converter that generates a first digital signal obtained by digitally converting a reset level of the electric signal generated by the plurality of photoelectric conversion elements and a second digital signal obtained by digitally converting the electric signal, the first holding circuit may hold the time code corresponding to the auto-zero signal or the first digital signal, and the second holding circuit may hold the time code corresponding to the detection signal or the second digital signal.

The imaging device may further includes:

a first selector that selects one of the auto-zero signal and the first digital signal and supplies the one selected to the first holding circuit; and a second selector that selects one of the detection signal and the second digital signal and supplies the one selected to the second holding circuit, in which the first selector and the second selector may perform selection operation in conjunction with each other such that the second holding circuit holds the time code corresponding to the detection signal when the first holding circuit holds the time code corresponding to the auto-zero signal, and the second holding circuit holds the time code corresponding to the second digital signal when the first holding circuit holds the time code corresponding to the first digital signal.

The time code generator may output the time code including a gray code.

In another aspect of the present disclosure, provided is an imaging method including:

outputting a detection signal from a detecting section in a case where an absolute value of a change amount of an electric signal exceeds a predetermined threshold among a plurality of pixels each having a plurality of photoelectric conversion elements that photoelectrically converts incident light to generate the electric signal;

performing predetermined signal processing on the basis of the detection signal;

outputting an auto-zero signal for initializing the detecting section;

holding a time code output from a time code generator in a first holding circuit when the auto-zero signal is output;

holding the time code output from the time code generator in a second holding circuit when the detection signal is output; and transferring the time code held in the first holding circuit and the time code held in the second holding circuit to a signal processing section in association with each other.

BRIEF DESCRIPTION OF DRAWINGS

FIG. 11 is a timing chart depicting a timing at which a time code transfer section according to the first embodiment transfers a time code or the like.

FIG. 14 is a timing chart depicting a timing at which a time code transfer section according to the second embodiment transfers a time code or the like.

FIG. 18 is a timing chart depicting a timing at which a time code transfer section according to the third embodiment transfers a time code or the like.

MODE FOR CARRYING OUT THE INVENTION

Hereinafter, embodiments of an imaging device will be described with reference to the drawings. Although main components of the imaging device will be mainly described below, the imaging device may have components and functions that are not illustrated or described. The following description does not exclude components and functions that are not illustrated or described.

First Embodiment

Figure 1:
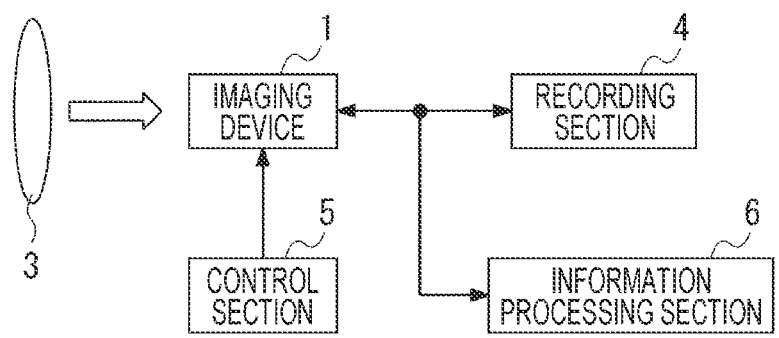
FIG. 1 is a block diagram depicting a schematic configuration of an imaging system 2 including an imaging device according to a first embodiment.

FIG. 1 is a block diagram depicting a schematic configuration of an imaging system 2 including an imaging device 1 according to a first embodiment. The imaging system 2 depicted in FIG. 1 includes an imaging lens 3, the imaging device 1, a recording section 4, a control section 5, and an information processing section 6. The imaging system 2 can be applied to a camera system mounted on an industrial robot, an in-vehicle camera system, and the like.

In the imaging system 2 of FIG. 1, the imaging lens 3 captures incident light from a subject and forms an image on an imaging surface of the imaging device 1. The imaging device 1 photoelectrically converts incident light captured by the imaging lens 3 in units of pixels to acquire imaging data. As described later, at least a part of the imaging device 1 can be implemented by a semiconductor device.

The imaging device 1 executes predetermined signal processing on the imaged image data, and records data regarding the processing result and a detection signal (hereinafter, it may be described as a "detection signal" or an "event detection signal") of an address event to be described later in the recording section 4. A method of generating the event detection signal will be described later. The control section 5 includes, for example, a microcomputer (CPU: Central Processing Unit), and controls an imaging operation in the imaging device 1. The information processing section 6 performs various types of information processing on the basis of the event detection signal output from the imaging device 1. Note that the information processing section 6 may be integrated inside the imaging device 1.

Figure 2:
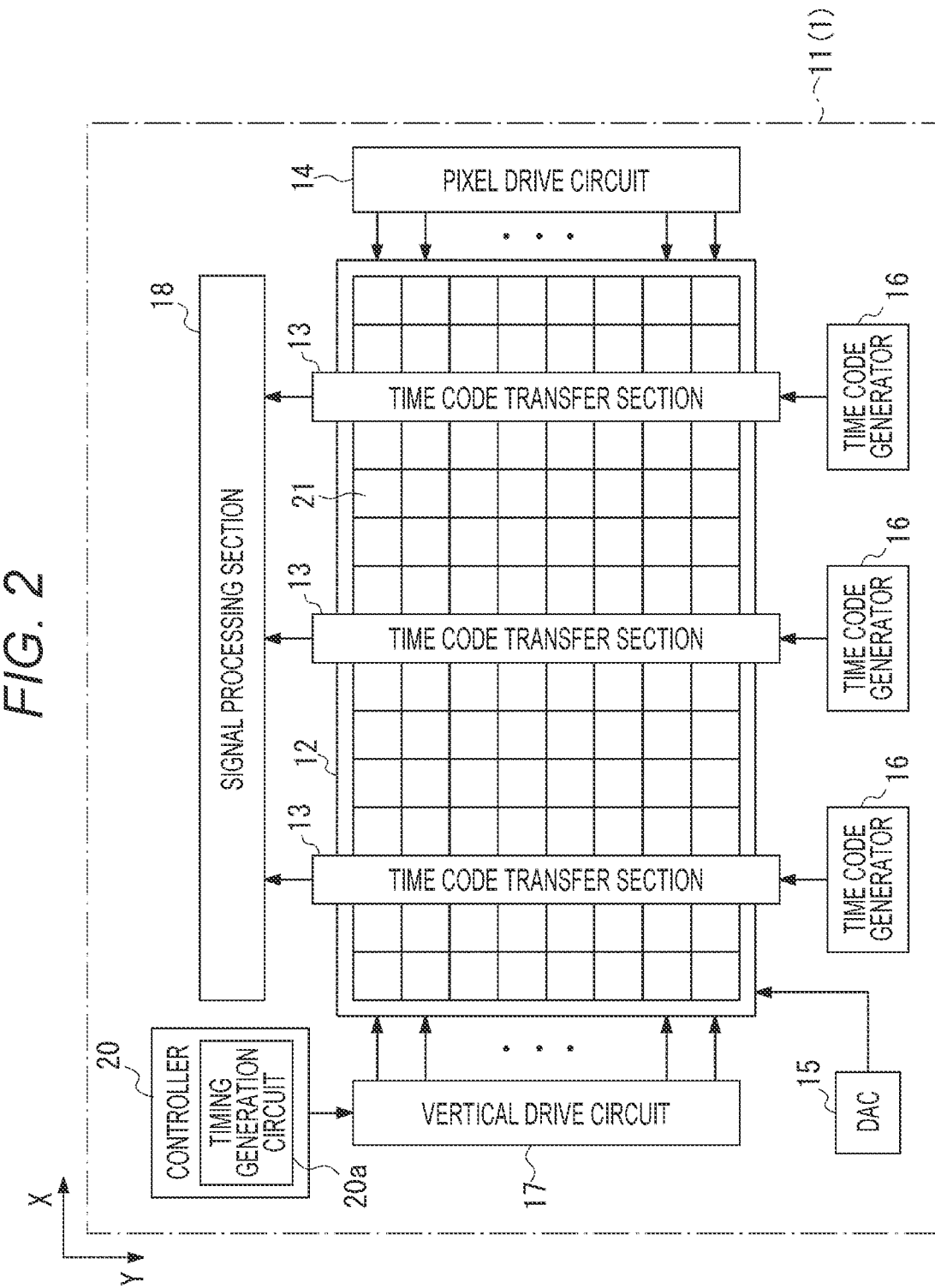
FIG. 2 is a block diagram depicting a schematic configuration of the imaging device according to the first embodiment.

FIG. 2 is a block diagram depicting a schematic configuration of the imaging device 1 according to the first embodiment. The imaging device 1 is formed on a semiconductor substrate 11, and includes a pixel array section 12, a time code transfer section 13, a pixel drive circuit 14, a digital analog converter (DAC) 15, a time code generator 16, a vertical drive circuit 17, a signal processing section 18, and a controller 20.

The semiconductor substrate 11 is a substrate formed using, for example, silicon (Si), and the pixel array section 12 in which a plurality of pixels 21 is arranged in a two-dimensional array is formed on the semiconductor substrate 11. Hereinafter, a set of the pixels 21 arrayed in the horizontal direction X of the pixel array section 12 is referred to as a "row", and a set of the pixels 21 arrayed in the direction Y perpendicular to the row is referred to as a "column".

Each of the plurality of pixels 21 arranged in a two-dimensional array generates a charge signal (analog pixel signal) corresponding to the light amount received by the light receiving element (hereinafter, it may be referred to as a photodiode) 22 in the pixel 21, converts the analog pixel signal into a digital pixel signal, and outputs the digital pixel signal. As described above, the imaging device 1 in FIG. 1 depicts an example in which AD conversion is performed for every pixel 21, but AD conversion may be performed in units of columns.

The time code generator 16 generates a time code that changes at a predetermined cycle. The time code generator 16 generates a time code regardless of the timing at which each pixel 21 images an image or the timing at which an event is detected. In the present embodiment, a time code is used to specify a pixel 21 that has output an event detection signal and an auto-zero signal to be described later. The time code generator 16 supplies the generated time code to the time code transfer section 13. In the example of FIG. 1, a plurality of time code generators 16 and a plurality of time code transfer sections 13 are provided along the horizontal (column) direction X of the pixel array section 12. The time code generated by the time code generator 16 is transferred by the corresponding time code transfer section 13. Note that, in a case where the number of pixels in the horizontal direction X of the pixel array section 12 is not so large, only one time code generator 16 and one time code transfer section 13 may be provided.

The time code transfer section 13 transfers the time code generated by the time code generator 16 to the signal processing section 18, and transfers the time code corresponding to the pixel 21 that has output the auto-zero signal and the time code corresponding to the pixel 21 that has output the event detection signal to the signal processing section 18. As depicted in FIG. 1, in a case where a plurality of time code transfer sections 13 is provided, each time code transfer section 13 transfers a time code corresponding to an auto-zero signal and a time code corresponding to an event detection signal for a plurality of surrounding pixels 21. An internal configuration of the time code transfer section 13 will be described later.

The pixel drive circuit 14 drives a pixel circuit and an ADC, which will be described later, provided in the pixel 21. The DAC generates a reference signal (reference voltage signal) REF, which is a slope signal whose level (voltage) monotonously decreases with the lapse of time, and supplies the reference signal REF to each pixel 21. The reference signal is used to convert an analog pixel signal into a digital pixel signal in each pixel 21.

The vertical drive circuit 17 drives any one of the plurality of pixel rows disposed along the vertical direction Y of the pixel array section 12. The event detection signal and the auto-zero signal of each pixel 21 belonging to the pixel row driven by the vertical drive circuit 17 are transmitted to the corresponding time code transfer section 13.

The signal processing section 18 receives the time codes from the time code generators 16 transferred from the plurality of time code transfer sections 13, the time code corresponding to the event detection signal of each pixel 21, and the time code corresponding to the auto-zero signal of each pixel 21. The signal processing section 18 performs predetermined signal processing on the basis of these time codes.

The signal processing section 18 may include a storage section that stores each time code transferred from the plurality of time code transfer sections 13.

The controller 20 controls each section in the imaging device 1. The controller 20 includes a timing generation circuit 20a. The timing generation circuit 20a supplies a signal indicating an operation timing of each section in the imaging device 1 to each section.

[Configuration Example of Pixel 21]

Figure 3:
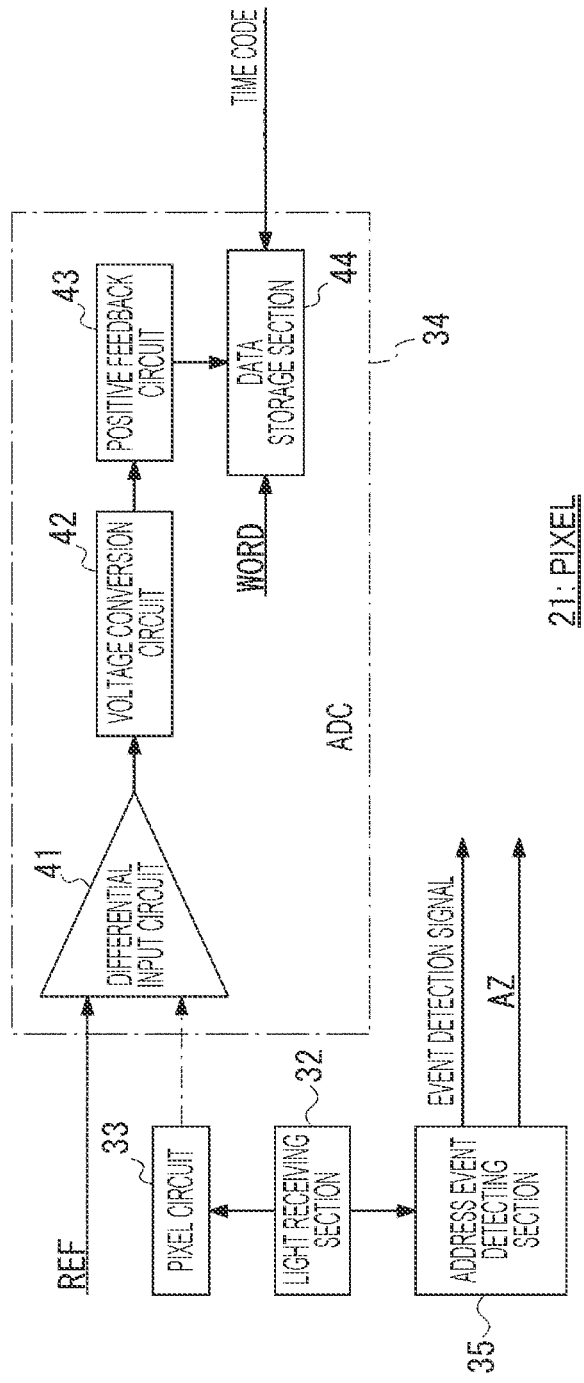
FIG. 3 is a block diagram depicting a detailed configuration of each pixel in a pixel array section.

FIG. 3 is a block diagram depicting a detailed configuration of each pixel 21 in the pixel array section 12. As depicted in FIG. 3, each pixel 21 includes a light receiving section 32, a pixel circuit 33, an analog-digital converter (hereinafter, referred to as an ADC or a pixel ADC) 34, and an address event detecting section 35.

The light receiving section 32 generates an analog pixel signal corresponding to the amount of received light. The light receiving section 32 includes, for example, a photodiode 22.

The pixel circuit 33 generates an analog pixel signal at a reset level and an analog pixel signal at a luminance signal level corresponding to the exposure amount. The reset level is a voltage when floating diffusion (FD) is initialized after the exposure is started. The luminance signal level is a voltage corresponding to the exposure amount at the end of exposure. The pixel circuit 33 sequentially supplies the analog pixel signal at the reset level and the analog pixel signal at the luminance signal level to the ADC 34.

The ADC 34 converts analog pixel signals at the reset level and the luminance signal level into digital pixel signals. In the present specification, a digital pixel signal obtained by performing AD conversion on an analog pixel signal at a reset level is referred to as P-phase data, and a digital pixel signal obtained by performing AD conversion on an analog pixel signal at a luminance signal level is referred to as D-phase data.

The ADC 34 includes a differential input circuit 41, a voltage conversion circuit 42, a positive feedback circuit 43, and a data storage section 44. The differential input circuit 41 compares the reference signal REF generated by the DAC 15 depicted in FIG. 2 with the analog pixel signal (reset level or luminance signal level) from the pixel circuit 33, and supplies a signal indicating a comparison result to the voltage conversion circuit 42. The voltage conversion circuit 42 converts a voltage level of a signal indicating a comparison result of the differential input circuit 41 and supplies the converted signal to the positive feedback circuit 43.

The positive feedback circuit 43 generates a signal VCO corresponding to the output signal of the voltage conversion circuit 42 and performs positive feedback to the voltage conversion circuit 42.

The data storage section 44 stores a digital pixel signal corresponding to the signal VCO. The time code output from the time code generator 16 and transferred by the time code transfer section 13 is input to the data storage section 44. In addition, the signal WORD input to the data storage section 44 becomes, for example, a high level at the time of the pixel 21 to be read. The data storage section 44 holds a time code when the logic of the output signal VCO of the positive feedback circuit 43 is inverted.

Figure 4:
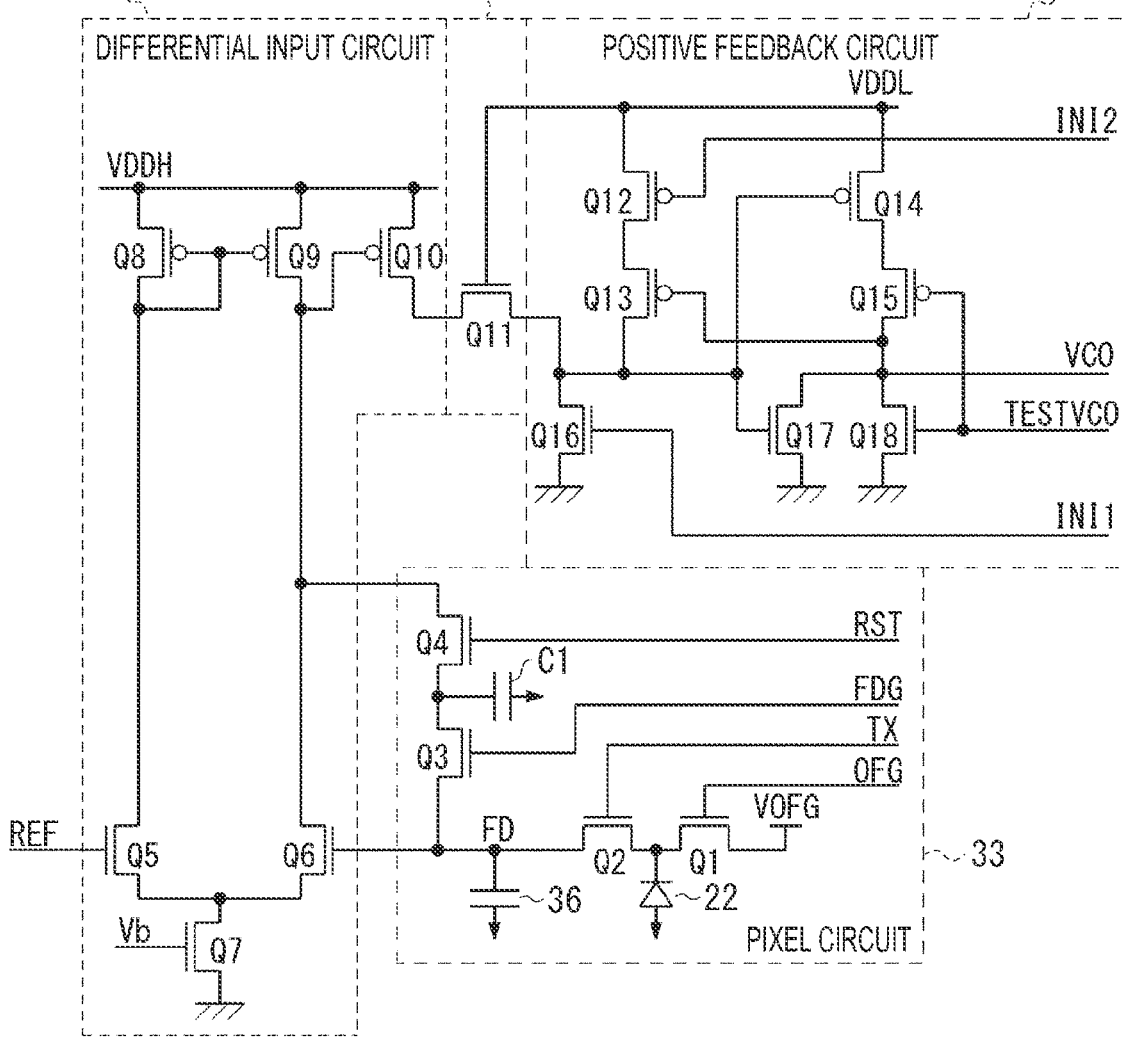
FIG. 4 is a circuit diagram depicting an example of detailed configurations of a pixel circuit, a differential input circuit in an ADC, a voltage conversion circuit, and a positive feedback circuit.

FIG. 4 is a circuit diagram depicting an example of detailed configurations of the pixel circuit 33, and the differential input circuit 41, the voltage conversion circuit 42, and the positive feedback circuit 43 in the ADC 34. The pixel circuit 33 includes a discharge transistor Q1, a transfer transistor Q2, a gain control transistor Q3, a reset transistor Q4, a floating diffusion (hereinafter, referred to as FD) 36, and a capacitor C1. Each of the transistors Q1 to Q4 in the pixel circuit 33 is, for example, an NMOS transistor.

The discharge transistor Q1 discharges the charge accumulated in the photodiode 22 at the start of exposure on the basis of the drive signal OFG from the pixel drive circuit 14. The transfer transistor Q2 transfers a charge from the photodiode 22 to the FD 36 at the end of exposure on the basis of a transfer signal TX from the pixel drive circuit 14. The FD 36 accumulates the transferred charge and generates a voltage corresponding to the accumulated charge amount.

The reset transistor Q4 initializes the FD 36 on the basis of a reset signal RST from the pixel drive circuit 14. The gain control transistor Q3 controls an analog gain with respect to the voltage of the FD 36 on the basis of a control signal FDG from the pixel drive circuit 14. The voltage of the FD 36 is reduced by the analog gain and output, so that the saturation signal amount of the pixel 21 can be expanded. The gain control transistor Q3 and the reset transistor Q4 are connected in series, and one end of the capacitor C1 is connected to a connection node thereof.

The differential input circuit 41 outputs a signal corresponding to a voltage difference between a voltage corresponding to the electric charge photoelectrically converted by the photodiode 22 and the reference voltage REF. The differential input circuit 41 includes an NMOS transistor pair Q5 and Q6, an NMOS transistor Q7, a PMOS transistor pair Q8 and Q9 constituting a current mirror circuit, and a PMOS transistor Q10. The reference signal REF is input to the gate of the transistor Q5, and the voltage signal of the FD 36 is input to the gate of the transistor Q6.

The transistor Q7 is connected between the sources of the transistors Q5 and Q6 and the ground node. A bias voltage Vb is input to the gate of the transistor Q7. The transistor pair Q8 and Q9 are connected between the power supply voltage node VDDH and the drains of the transistor pair Q5 and Q6. The gate of the transistor Q10 is connected to the drains of the transistors Q6 and Q9.

The voltage conversion circuit 42 includes an NMOS transistor Q11. The power supply voltage VDDL is input to the gate of the transistor Q11, and the drain of the transistor Q11 is connected to the drain of the transistor Q10. The voltage conversion circuit 42 converts the output voltage of the differential input circuit 41 to a lower voltage level.

The positive feedback circuit 43 includes PMOS transistors Q12 to Q15 and NMOS transistors Q16 to Q18. The source of the transistor Q11 is connected to the drain of the transistor Q16, and the source of the transistor Q16 is grounded. A signal INI from the pixel drive circuit 14 is input to the gate of the transistor Q16. Each gate of the transistors Q14 and Q17 is connected to the source of the transistor Q11. A signal TESTVCO from the pixel drive circuit 14 is input to each gate of the transistors Q15 and Q18. A signal VCO is output from the drain of the transistor Q17. A signal INI2 from the pixel drive circuit 14 is input to the gate of the transistor Q12.

Figure 5:
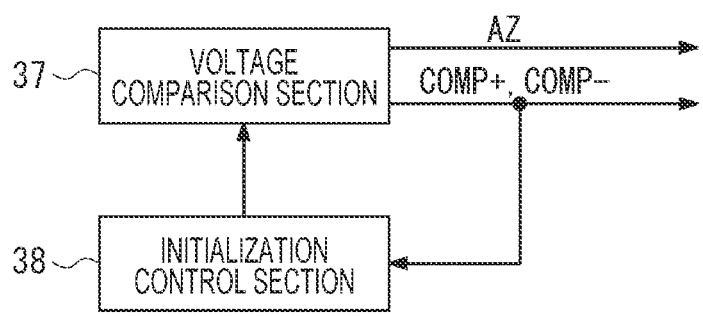
FIG. 5 is a block diagram depicting an internal configuration of an address event detecting section in FIG. 3.

FIG. 5 is a block diagram depicting an internal configuration of the address event detecting section 35 in FIG. 3. As depicted in FIG. 5, the address event detecting section 35 includes a voltage comparison section 37 and an initialization control section 38.

The voltage comparison section 37 compares an analog differential signal corresponding to the change amount of the incident light with a predetermined voltage (upper limit voltage or lower limit voltage) indicating a boundary of a predetermined voltage range, and outputs event detection signals COMP+ and COMP− indicating the comparison result.

Every time the comparison result COMP is output, the initialization control section 38 supplies the auto-zero signal XAZ to the voltage comparison section 37 to control the differential signal to an initial value. Note that, in the present specification, the signals AZ and XAZ whose logic is inverted from each other are collectively referred to as an auto-zero signal.

[Configuration Example of Voltage Comparison Section 37]

Figure 6:
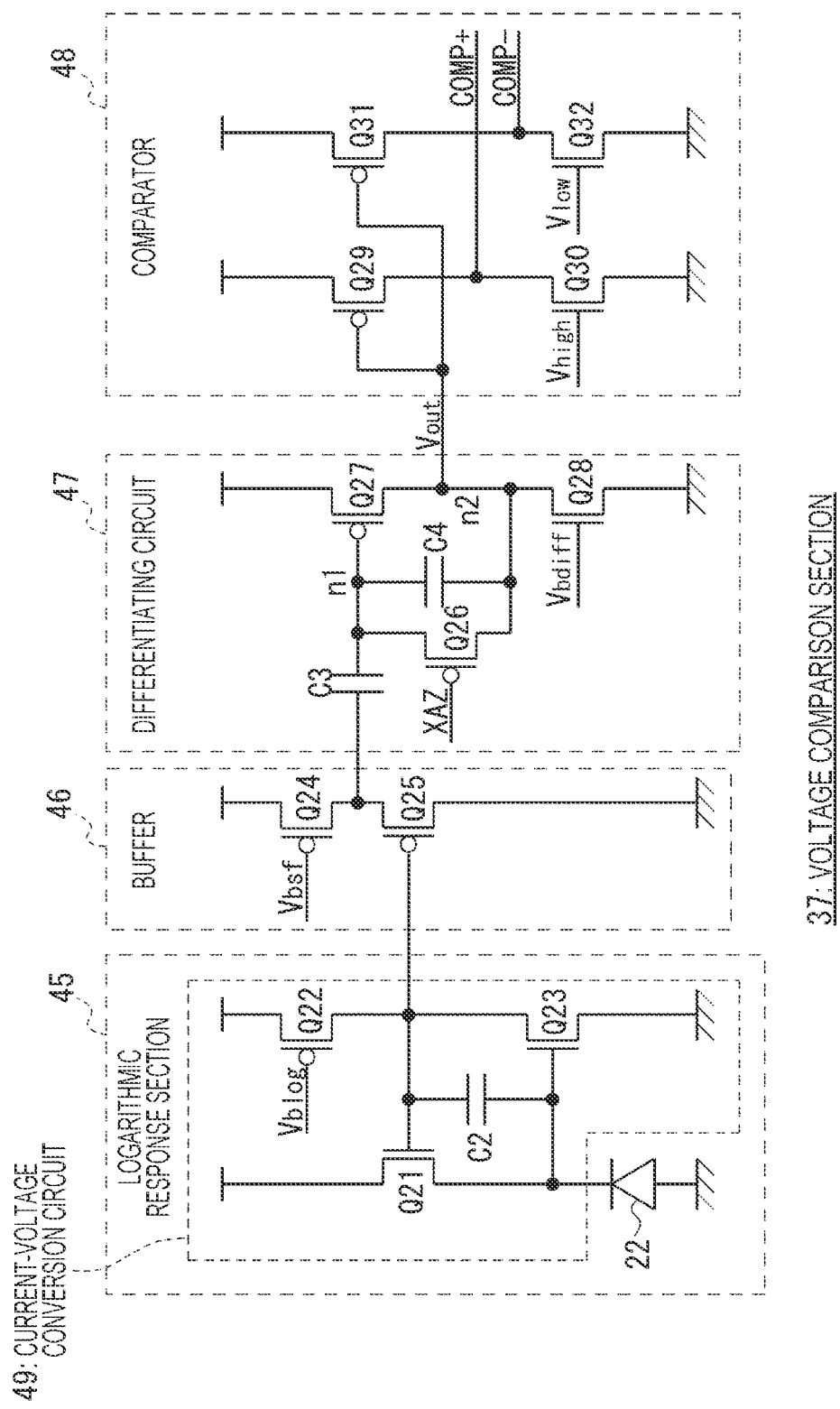
FIG. 6 is a circuit diagram depicting an example of a voltage comparison section.

FIG. 6 is a circuit diagram depicting an example of the voltage comparison section 37. The voltage comparison section 37 includes a logarithmic response section 45, a buffer 46, a differentiating circuit 47, and a comparator 48.

A current-voltage conversion section 49 in the logarithmic response section 45 generates a pixel voltage Vp obtained by logarithmically converting the charge (photocurrent) generated by the photodiode 22. The current-voltage conversion section 49 includes NMOS transistors Q21 and Q22, a capacitor C2, and a PMOS transistor Q23.

The source of the transistor Q21 is connected to the cathode of the photodiode 22, and the drain is connected to the power supply voltage node. The transistor Q22 and the transistor Q23 are connected in series between a power supply voltage node and a predetermined reference potential (ground potential or the like) node. In addition, the connection node of the transistor Q22 and the transistor Q23 is connected to the gate of the transistor Q21 and the input node of the buffer 46. A connection node between the drain of the transistor Q21 and the cathode of the photodiode 22 is connected to the gate of the transistor Q23.

In addition, a predetermined bias voltage Vblog is applied to the gate of the transistor Q22. The capacitor C2 is connected between the gate of the transistor Q21 and the gate of the transistor Q23.

As will be described later, a semiconductor chip on which the photodiode 22 is disposed and a semiconductor chip on which circuits on a subsequent stage side of the photodiode 22 is disposed may be stacked. Alternatively, a semiconductor chip on which the photodiode 22, the transistors Q21 to Q23, and the capacitor C2 are disposed and a semiconductor chip on which circuits on a subsequent stage side thereof is disposed may be stacked. As described above, among the circuit products depicted in FIG. 6, the circuit components disposed on the same or different semiconductor chips are arbitrary.

The buffer 46 outputs the input pixel voltage to the differentiating circuit 47. The buffer 46 can improve the driving force for driving the subsequent stage. In addition, the buffer 46 can ensure noise isolation associated with a switching operation in the subsequent stage.

In addition, the buffer 46 includes a transistor Q24 and a transistor Q25. As these transistors, for example, MOS transistors are used.

In the buffer 46, the transistor Q24 and the transistor Q25 are connected in series between the power supply voltage node and the terminal of the reference potential. In addition, the gate of the transistor Q25 is connected to the logarithmic response section 45, and a connection node of the transistor Q24 and the transistor Q25 is connected to the differentiating circuit 47. A predetermined bias voltage Vbsf is applied to the gate of the transistor Q24.

The differentiating circuit 47 obtains a change amount of the pixel voltage Vp by differential operation. The change amount of the pixel voltage Vp indicates the change amount of the light amount. The differentiating circuit 47 supplies a differential signal Vout indicating the change amount in the light amount to the comparator 48.

In addition, the differentiating circuit 47 includes capacitors C3 and C4, a transistor Q26 and a transistor Q27, and a transistor Q28.

The transistor Q27 and the transistor Q28 are connected in series between the power supply voltage node and the reference potential node. A predetermined bias voltage Vbdiff is input to the gate of the transistor Q28. These transistors Q27 and Q28 function as an inversion circuit in which the gate of the transistor Q27 is set as an input node n1 and the connection node of the transistor Q27 and the transistor Q28 is set as an output node n2.

The capacitor C3 is inserted between the buffer 46 and the gate of the transistor Q27. The capacitor C3 supplies a current corresponding to the time derivative (in other words, the change amount) of the pixel voltage Vp from the buffer 46 to the gate of the transistor Q27. In addition, the capacitor C4 is inserted between the gate of the transistor Q27 and the output node n2.

The transistor Q26 opens and closes a path between the input node n1 and the output node n2 in accordance with an auto-zero signal XAZ from the initialization control section 38. For example, every time the count value is counted, the initialization control section 38 sets the auto-zero signal XAZ from the high level to the low level and instructs initialization. Then, the transistor Q26 shifts to an on state according to the auto-zero signal XAZ, and sets the differential signal Vout to an initial value.

The comparator 48 compares the differential signal Vout with a predetermined voltage (upper limit voltage or lower limit voltage) indicating a boundary of a certain voltage range. The comparator 48 includes a transistor Q29 and a transistor Q31, and a transistor Q30 and a transistor Q32. As these transistors, for example, MOS transistors are used.

In the comparator 48, the transistor Q29 and the transistor Q30 are connected in series between the power supply voltage node and the reference voltage node, and the transistor Q31 and the transistor Q32 are also connected in series between the power supply voltage node and the reference voltage node. In addition, the gates of the transistor Q29 and the transistor Q31 are connected to the differentiating circuit 47. An upper limit voltage Vhigh is applied to the gate of the transistor Q30, and a lower limit voltage Vlow is applied to the gate of the transistor Q32.

The voltage of the connection node of the transistor Q29 and the transistor Q30 is output as a comparison result COMP+ with the upper limit voltage. The voltage of the connection node of the transistor Q31 and the transistor Q32 is output as a comparison result COMP− with the lower limit voltage. With such connection, the comparator 48 outputs the high-level comparison result COMP+ in a case where the differential signal Vout is higher than the upper limit voltage Vhigh, and outputs the low-level comparison result COMP− in a case where the differential signal Vout is lower than the lower limit voltage Vlow. The event detection signal COMP is a signal including the comparison results COMP+ and COMP−.

Note that, although the comparator 48 compares both the upper limit voltage and the lower limit voltage with the differential signal Vout, only one of the upper limit voltage and the lower limit voltage may be compared with the differential signal Vout. Therefore, the internal configuration of the comparator 48 can be simplified. For example, in comparison with the upper limit voltage, only the transistor Q29 and the transistor Q30 are required, and the transistors Q31 and Q32 can be omitted.

Figure 7:
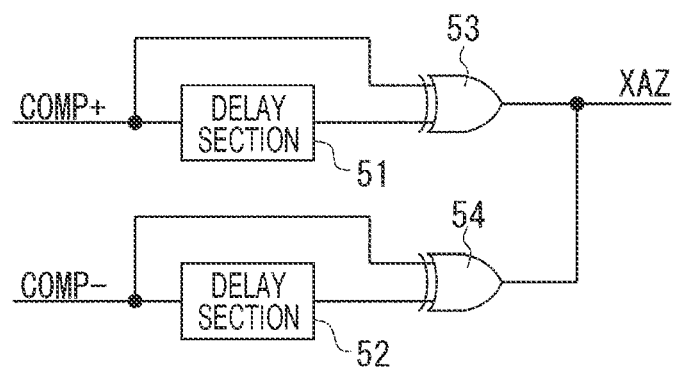
FIG. 7 is a circuit diagram depicting a configuration example of an initialization control section.

FIG. 7 is a circuit diagram depicting a configuration example of the initialization control section 38. The initialization control section 38 includes delay sections 51 and 52 and exclusive OR (XOR) gates 53 and 54.

The delay section 51 delays the comparison result COMP+ from the comparator 48. The delay section 51 supplies the delayed signal to the XOR gate 53. The delay section 52 delays the comparison result COMP− from the comparator 48. The delay section 51 supplies the delayed signal to the XOR gate 54.

The XOR gate 53 generates an exclusive OR of the comparison results COMP+ before and after the delay. The XOR gate 54 generates an exclusive OR of the comparison results COMP− before and after the delay. The XOR gates 53 and 54 generate pulse signals. This pulse signal is output to the differentiating circuit 47 as an auto-zero signal XAZ.

[Configuration of Time Code Transfer Section 13]

As depicted in FIG. 2, for example, a plurality of time code transfer sections 13 is provided in the horizontal direction of the pixel array section 12. A time code generator 16 is connected to one end side of the time code transfer section 13, and a signal processing section 18 is connected to the other end side. The time code transfer section 13 includes a plurality of clusters connected in series as described later. Each cluster holds time codes and the like of a predetermined pixel 21 column for a plurality of rows. In addition, each cluster sequentially transfers the time codes from the time code generator 16.

As described above, each cluster in the time code transfer section 13 sequentially transfers the time code from the time code generator 16, the time code corresponding to the pixel 21 that has output the auto-zero signal, and the time code corresponding to the pixel 21 that has output the event detection signal in association with each other. In addition, each cluster in the time code transfer section 13 transfers specific data for the pixel 21 from which the event detection signal and the auto-zero signal have not been output.

Figure 8:
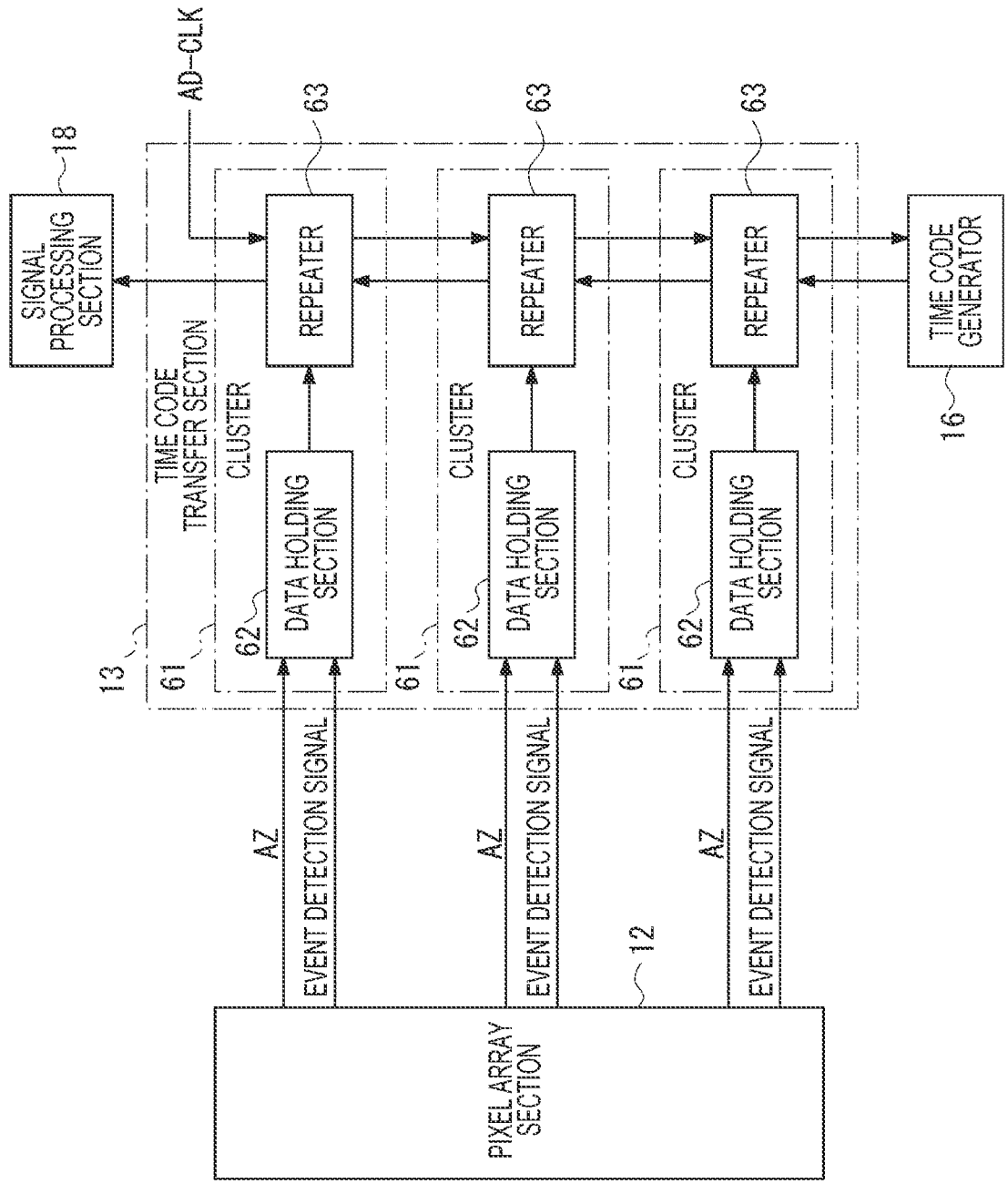
FIG. 8 is a block diagram depicting an internal configuration of a cluster in a time code transfer section according to the first embodiment.

FIG. 8 is a block diagram depicting an internal configuration of a cluster 61 in the time code transfer section 13 according to the first embodiment. As depicted in FIG. 8, each cluster 61 in the time code transfer section 13 includes a data holding section 62 and a repeater 63. The data holding section 62 holds a time code corresponding to the pixel 21 that has output the auto-zero signal and holds a time code corresponding to the pixel 21 that has output the event detection signal.

One data holding section 62 can sequentially hold the time codes of the event detection signal and the auto-zero signal for the plurality of pixels for each pixel. The data holding section 62 holds specific data (for example, zero) for the pixel 21 from which the event detection signal or the auto-zero signal has not been output. As described above, the data holding section 62 holds the time stamp only for the pixel 21 from which the event detection signal or the auto-zero signal has been output, and the other pixels 21 hold specific data. Therefore, the time code transfer section 13 transfers the time code or the specific data for all the pixels in the order of arrangement of the pixels, and the signal processing section 18 that receives the data from the time code transfer section 13 can easily specify which pixel 21 has output the event detection signal or the auto-zero signal.

Note that the data holding section 62 may hold not only the time code corresponding to the pixel 21 that has output the event detection signal but also polarity information indicating whether the luminance signal tends to increase or decrease. In addition, the data holding section 62 may hold the address information of the pixel 21 that has output the event detection signal together.

As described above, the time code transfer section 13 includes the clusters 61 connected in series in a plurality of stages. The cluster 61 in the first stage holds the time code output from the time code generator 16, and holds the time code corresponding to the auto-zero signal and the time code corresponding to the event detection signal held in the corresponding data holding section 62. The clusters 61 in the second and subsequent stages transfer the time codes sequentially transferred from the time code generator 16 held in the cluster 61 in the preceding stage to the cluster 61 in the subsequent stage, transfer the time code corresponding to the auto-zero signal and the time code corresponding to the event detection signal held in the corresponding data holding section 62 to the cluster 61 in the subsequent stage, and transfer the data held by the cluster 61 in the preceding stage to the cluster 61 in the subsequent stage.

Figure 9:
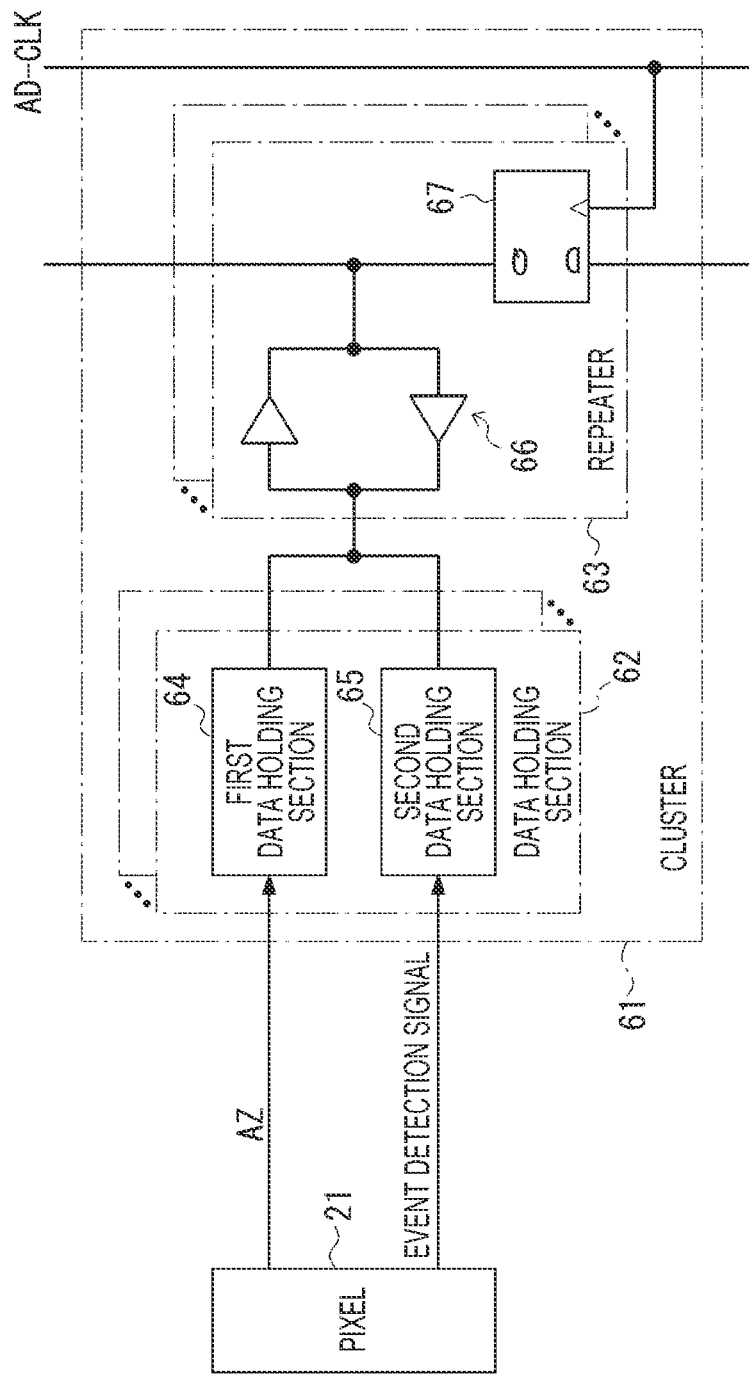
FIG. 9 is a block diagram in which an internal configuration of a data holding section and a repeater in each cluster of FIG. 8 is further embodied.

FIG. 9 is a block diagram in which an internal configuration of the data holding section 62 and the repeater 63 in each cluster 61 of FIG. 8 is further embodied. As depicted in FIG. 9, each data holding section 62 includes a first data holding section (first holding circuit) 64 that holds a time code corresponding to an auto-zero signal and a second data holding section (second holding circuit) 65 that holds a time code corresponding to an event detection signal. Each of the first data holding section 64 and the second data holding section 65 can hold, for example, time codes for 128 pixels (32 pixels in the horizontal direction×4 pixels in the vertical direction). Note that the number of pixels to be held is arbitrary. The first data holding section 64 and the second data holding section 65 hold specific data (for example, zero) for the pixel 21 from which the event detection signal or the auto-zero signal has not been output.

As depicted in FIG. 9, each repeater 63 includes a bidirectional buffer 66 and a D type flip-flop (hereinafter referred to as D-F/F) 67. The D-F/F 67 holds the data transferred from the repeater 63 in the preceding stage at the rising timing of the clock signal AD-CLK. The data held by the D-F/F 67 includes the time code from the time code generator 16. This time code is input to the first data holding section 64 and the second data holding section 65 via the bidirectional buffer 66. The first data holding section 64 holds the time code in synchronization with the clock signal AD-CLK when the event detection signal is input. For the pixel 21 to which the event detection signal is not input, specific data is held in synchronization with the clock signal AD-CLK. Similarly, the second data holding section 65 holds the time code in synchronization with the clock signal AD-CLK when the auto-zero signal is input.

The data holding section 62 in FIG. 9 holds, for example, 15 bit time code data. Similarly, the repeater 63 sequentially transfers, for example, 15 bit time code data.

Figure 10:
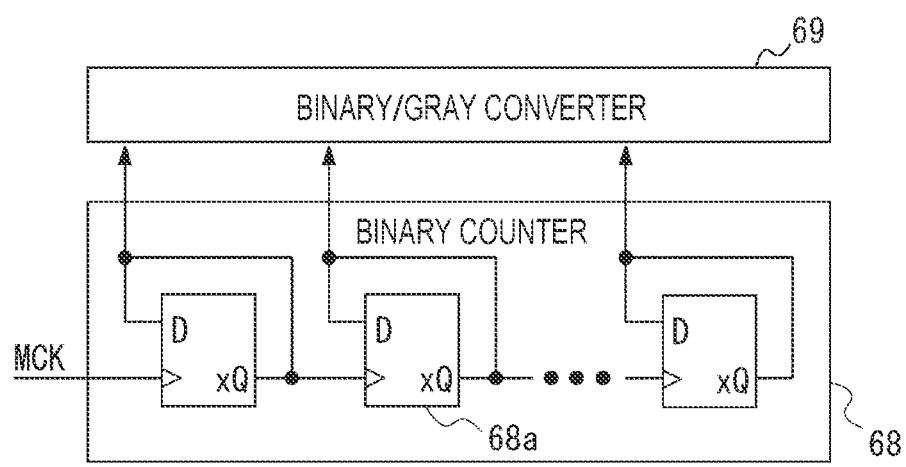
FIG. 10 is a block diagram depicting an example of an internal configuration of a time code generator.

FIG. 10 is a block diagram depicting an example of an internal configuration of the time code generator 16. The time code generator 16 in FIG. 10 includes a binary counter 68 and a binary/gray converter 69. The binary counter 68 is a counter that counts a binary number, and has a configuration in which a plurality of binary frequency dividers is connected in series. The binary frequency divider is configured by feeding back the xQ output of the D-F/F 68a to the D input. The cycle of the output signal of each binary frequency divider differs by a power of two.

The binary/gray converter 69 converts the binary count value from the binary counter 68 into a gray code. The gray code changes only one bit between adjacent codes, and the power consumption can be reduced by minimizing the number of changes of bits between codes. As described above, by setting the time code output from the time code generator 16 to the gray code, it is possible to suppress power consumption when the time code transfer section 13 sequentially transfers the time code.

Note that the time code output from the time code generator 16 is not necessarily a gray code. For example, the output value of the binary counter 68 in FIG. 10 may be used as it is as the time code. In this case, the binary/gray converter 69 can be omitted, but the power consumption at the time of the time code transfer increases in the case of using the gray code.

Figure 11:
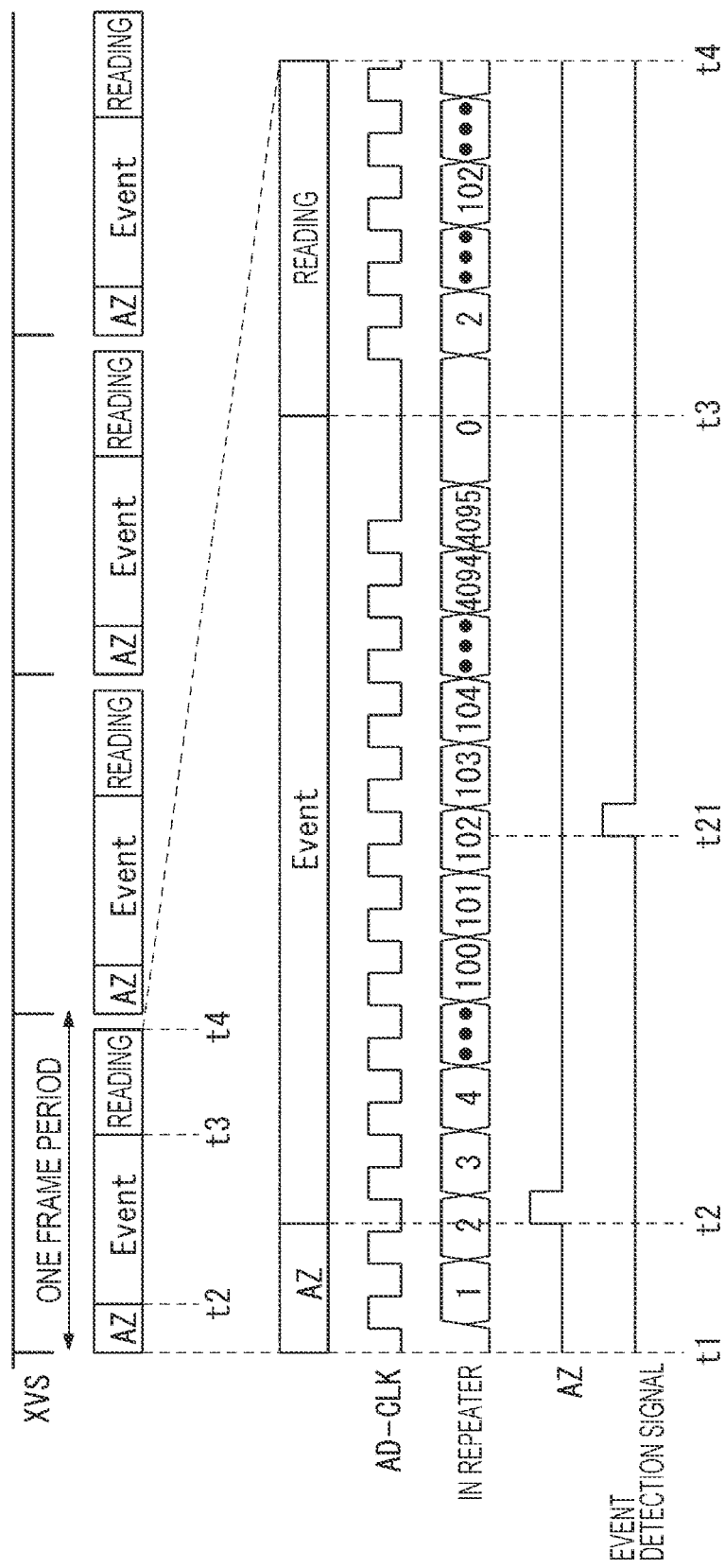

FIG. 11 is a timing chart depicting a timing at which the time code transfer section 13 according to the first embodiment transfers a time code or the like. The upper-side two timing charts in FIG. 11 depict the vertical synchronization signal XVS of the pixel array section 12 and the operation period of the imaging device 1 in each frame. In addition, the lower-side four timing charts in FIG. 11 depict the clock signal AD-CLK within one frame period, the time code from the time code generator 16 transferred by the repeater 63, the generation timing of the auto-zero signal AZ, and the generation timing of the event detection signal.

As depicted in the upper-side two timing charts of FIG. 11, for every frame, there are provided a period (time t1 to t2) in which the time code corresponding to the pixel 21 that has output the auto-zero signal AZ is held in the first data holding section 64, a period (time t2 to t3) in which the time code corresponding to the pixel 21 that has output the event detection signal is held in the second data holding section 65, and a period (time t3 to t4) in which the time codes held in the first data holding section 64 and the second data holding section 65 are transferred via the time code transfer section 13.

In the example of FIG. 11, an auto-zero signal is output at time t2, and an event detection signal is output at time t21 between times t2 and t3.

Between times t1 to t3, each cluster 61 in the time code transfer section 13 sequentially transfers the time codes from the time code generator 16. In addition, the first data holding section 64 in the data holding section 62 holds a time code corresponding to the pixel 21 that has output the auto-zero signal at time t2. Similarly, at time t21, the second data holding section 65 holds a time code corresponding to the pixel 21 that has output the event detection signal.

From the time t3 to t4, the cluster 61 in the time code transfer section 13 transfers the corresponding time codes for the pixel 21 that has output the own zero signal and the pixel 21 that has output the event detection signal, respectively, and the other pixels transfer specific data.

More specifically, in the present embodiment, for every frame, all the pixels 21 in the pixel array section 12 are scanned to detect the pixel 21 that has output the auto-zero signal or the event detection signal, and the first data holding section 64 or the second data holding section 65 holds the time code corresponding to the pixel 21 that has output the auto-zero signal or the event detection signal.

The auto-zero signal and the event detection signal output from the arbitrary pixel 21 in the pixel array section 12 are input to the corresponding data holding section 62 depicted in FIGS. 8 and 9. The first data holding section 64 in the data holding section 62 holds a time code corresponding to the pixel 21 that has output the auto-zero signal, and the second data holding section 65 holds a time code corresponding to the pixel 21 that has output the event detection signal. The time code is held in synchronization with the clock signal AD-CLK. The clock signal AD-CLK is a signal used by the time code generator 16 to update the time code. FIG. 11 depicts an example in which a time code corresponding to an auto-zero signal is held at time t2. In the present embodiment, for every frame, all the pixels 21 output the auto-zero signal at the same timing, but since the time until the time code from the time data generator is transferred to the plurality of data holding sections 62 is different, each data holding section 62 holds the time code corresponding to the auto-zero signal at different timings. As described above, since the time codes are sequentially transferred between the clusters 61, each data holding section 62 holds the time codes corresponding to the auto-zero signals at different timings. Therefore, the value of the time code corresponding to the auto-zero signal becomes a different value for every data holding section 62.

FIG. 11 depicts an example in which the event detection signal is output at time t21 between times t2 and t3, and the first data holding section 64 holds a time code corresponding to the event detection signal in synchronization with the clock signal AD-CLK. As described above, the data holding section 62 holds the time code corresponding to the pixel 21 that has output the auto-zero signal and the time code corresponding to the pixel 21 that has output the event detection signal. These time codes are transmitted to the signal processing section 18 via the time code transfer section 13. The signal processing section 18 can specify in which pixel 21 the event has occurred by taking a difference between the time code corresponding to the pixel 21 that has output the event detection signal and the time code corresponding to the pixel 21 that has output the auto-zero signal.

Note that, for the pixel 21 in which no event has occurred, the time code transfer section 13 transfers specific data (for example, zero) in synchronization with the clock signal AD-CLK instead of transferring the time code. Therefore, the signal processing section 18 can more accurately detect in which pixel 21 the event has occurred by extracting the time code included in the specific data and counting the number of pieces of specific data between the time codes.

Figure 12A:
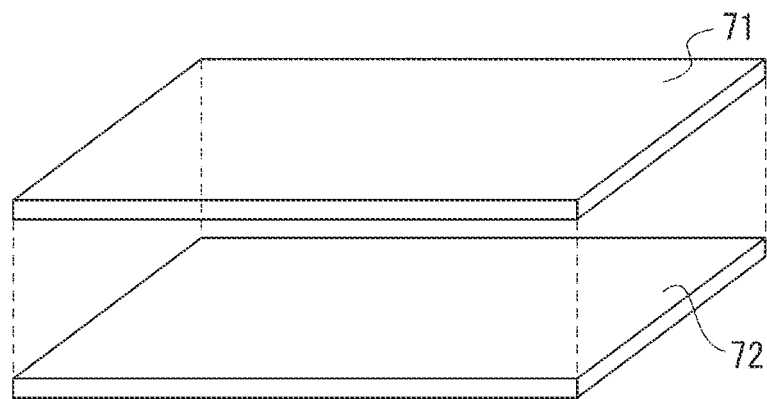
FIG. 12A is a schematic perspective view depicting a first example of a laminated chip.

The imaging device 1 according to the present embodiment can include, for example, a plurality of stacked semiconductor chips (hereinafter, referred to as a laminated chip) 70. FIG. 12A is a schematic perspective view depicting a first example of the laminated chip 70. FIG. 12A includes a first semiconductor chip 71 and a second semiconductor chip 72 stacked below the first semiconductor chip 71. For example, a plurality of pixels 21 in the pixel array section 12 is disposed on the first semiconductor chip 71. A portion that receives light and performs photoelectric conversion is disposed at least on the first semiconductor chip 71. On the second semiconductor chip 72, the data holding section 62, the time code generator 16, the time code transfer section 13, the signal processing section 18, and the like are disposed.

The first semiconductor chip 71 and the second semiconductor chip 72 mutually transmit signals via a connection portion such as a via (VIA), a Cu—Cu junction, a bump, or the like.

Figure 12B:
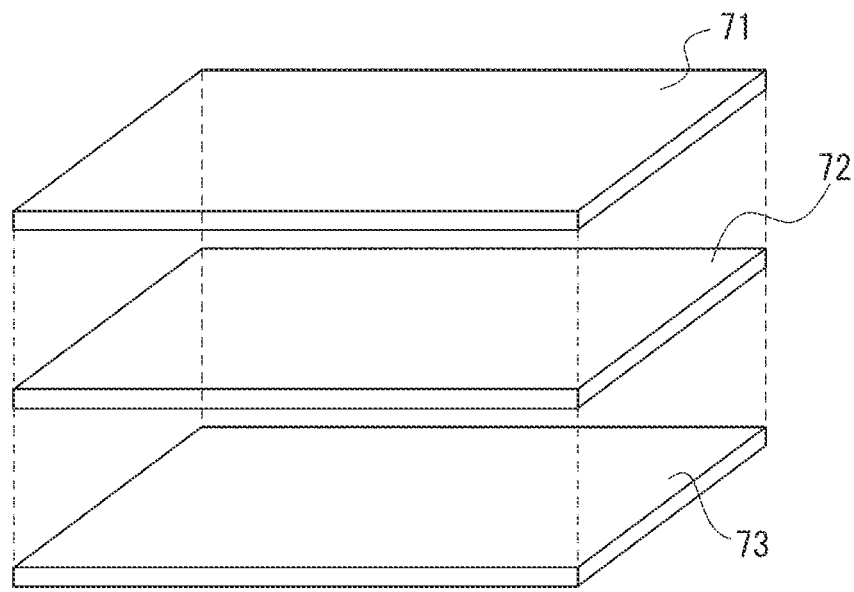
FIG. 12B is a schematic perspective view depicting a second example of a laminated chip.

FIG. 12B is a schematic perspective view depicting a second example of the laminated chip 70. The laminated chip 70 in FIG. 12B includes a first semiconductor chip 71, a second semiconductor chip 72 stacked below the first semiconductor chip 71, and a third semiconductor chip 73 stacked below the second semiconductor chip 72. In the first semiconductor chip 71 of FIG. 12B, for example, a plurality of pixels 21 in the pixel array section 12 is disposed. In the second semiconductor chip 72, the time code generator 16, the time code transfer section 13, the signal processing section 18, and the like are disposed. In the third semiconductor chip 73, a semiconductor memory such as the data holding section 62 or the like is mainly disposed.

Note that FIGS. 12A and 12B are merely representative examples of the laminated chip 70, and various modifications are conceivable. In addition, what kind of circuit is disposed on the first semiconductor chip 71 and the second semiconductor chip 72 in FIGS. 12A and 12B and the third semiconductor chip 73 in FIG. 12B is arbitrary, and various modifications are conceivable. Moreover, the laminated chip 70 having four or more layers may be configured, or the laminated chip 70 having a plurality of layers in which at least one layer in the laminated chip 70 is divided in the same layer may be configured.

As described above, in the first embodiment, since the time code corresponding to the auto-zero signal output from the arbitrary pixel 21 in the pixel array section 12 and the time code corresponding to the event detection signal are transferred using the plurality of clusters 61 in the time code transfer section 13, the signal processing section 18 can simply and quickly detect in which pixel 21 in the pixel array section 12 when the event has occurred.

The time code transfer section 13 is used to transfer a time code corresponding to a luminance value in a case where AD conversion is performed for every pixel 21. According to the present embodiment, the time code transfer section 13 provided for performing AD conversion for every pixel 21 can be diverted to transfer the time code corresponding to the auto-zero signal and the time code corresponding to the event detection signal. Therefore, it is possible to detect an event without complicating the internal configuration of the imaging device 1.

In addition, in a case where the time code is transferred to the signal processing section 18 using the time code transfer section 13, timings at which the plurality of data holding sections 62 disposed along the transfer direction of the time code hold the time code are different. Therefore, by holding the time code corresponding to the pixel 21 that outputs the auto-zero and taking a difference from the time code corresponding to the pixel 21 that outputs the event detection signal, it is possible to solve the problem that the timing of holding the time code is shifted for every data holding section 62.

Second Embodiment

In a second embodiment, two columns of clusters 61 in the time code transfer section 13 are provided.

Figure 13:
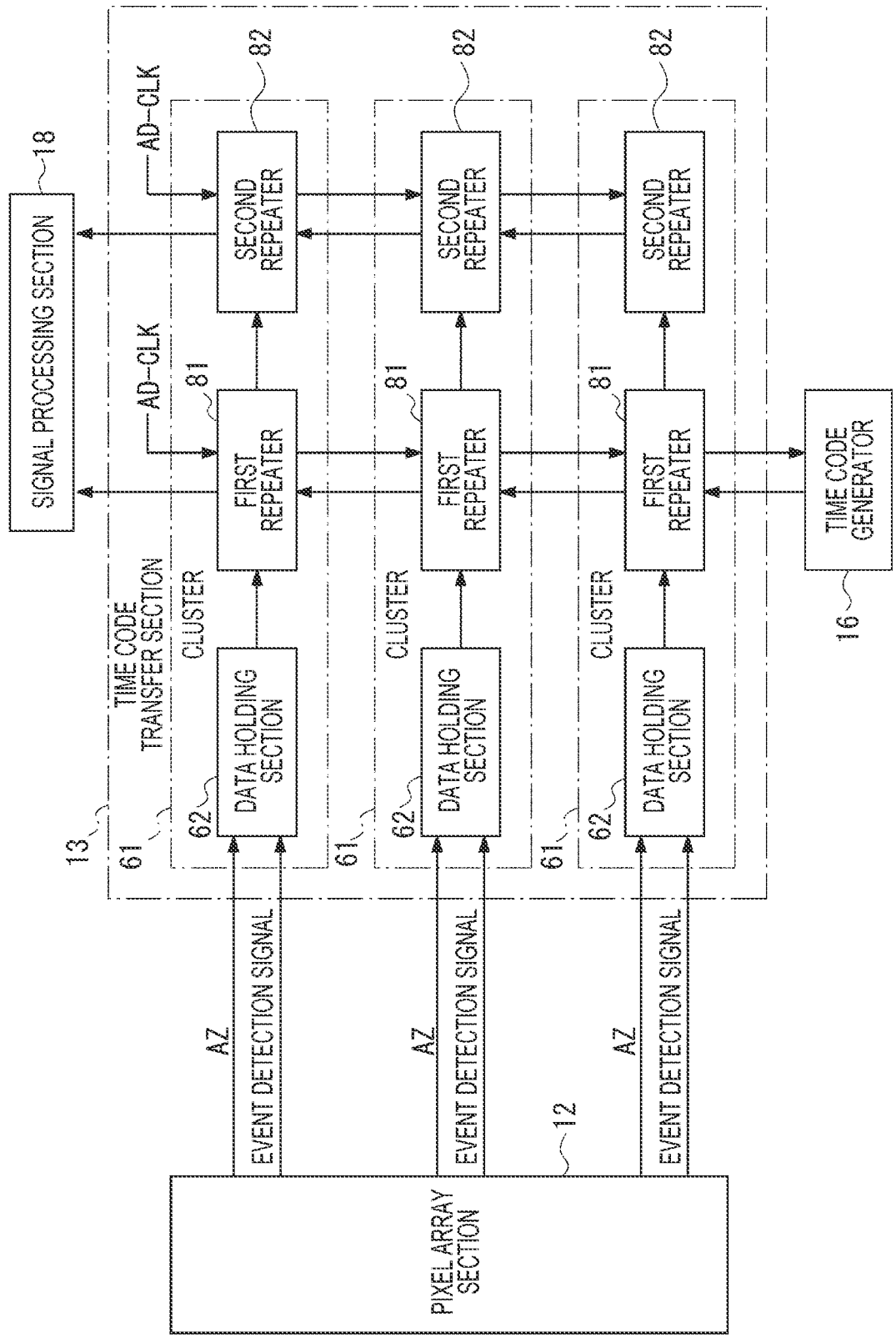
FIG. 13 is a block diagram depicting an internal configuration of a cluster in a time code transfer section according to a second embodiment.

FIG. 13 is a block diagram depicting an internal configuration of a cluster 61 in a time code transfer section 13 according to the second embodiment. The time code transfer section 13 in FIG. 13 includes first repeaters 81 in a plurality of stages and second repeaters 82 in a plurality of stages. The time code from the time code generator 16 is input to the first repeater 81 in the first stage among the first repeaters 81 in the plurality of stages. The first repeater 81 in the final stage and the second repeater 82 in the final stage are connected to the signal processing section 18.

Each of the first repeaters 81 in the plurality of stages is associated with one of the second repeaters 82 in the plurality of stages. More specifically, each of the first repeaters 81 in the plurality of stages transfers the time code to the corresponding second repeater 82. For example, the first repeaters 81 in the plurality of stages perform processing of sequentially transferring the time code from the time code generator 16 and transmitting the time code to the signal processing section 18, and transfer the time code corresponding to the auto-zero signal received from the data holding section 62 and the time code corresponding to the event detection signal to the corresponding second repeater 82. The second repeaters 82 in the plurality of stages sequentially transfer the time code corresponding to the auto-zero signal and the time code corresponding to the event detection signal transferred from the first repeaters 81 in the plurality of stages, and transmit the time codes to the signal processing section 18.

Figure 14:
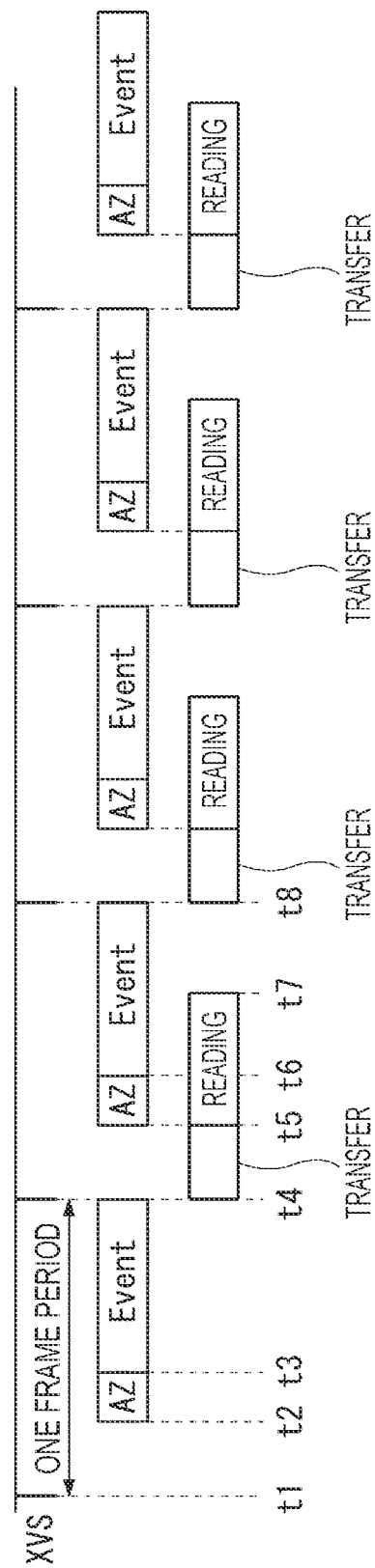

FIG. 14 is a timing chart depicting a timing at which the time code transfer section 13 according to the second embodiment transfers a time code or the like. As depicted in FIG. 14, all the pixels 21 in the pixel array section 12 output an auto-zero signal and hold the time code in the first data holding section 64 (times t2 to t3), and thereafter, event detection is performed on all the pixels 21, and the time code corresponding to the pixel 21 that has output the event detection signal is held in the second data holding section 65 (aging t3 to t4). The above operation is performed in one frame period from time t1 to time t4. In the next frame period, the time code held in the first data holding section 64 and the time code held in the second data holding section 65 are transferred from the first repeater 81 to the second repeater 82 between times t4 and t5, and transferred among the plurality of second repeaters 82 and read by the signal processing section 18 between times t5 and t7. In addition, from time t5 to time t6, all the pixels 21 in the pixel array section 12 again output the auto-zero signal and hold the time code in the first data holding section 64, and thereafter, the event detection processing is performed, and the time code corresponding to the pixel 21 that has output the event detection signal is held in the second data holding section 65 (time t6 to t8).

As can be seen by comparing FIG. 14 with FIG. 11, in FIG. 14, the output of the auto-zero signal and the event detection may be performed over one frame, and the transfer processing to the signal processing section 18 is performed in the next frame, so that each processing can be performed with time to spare. That is, in the second embodiment, in addition to the plurality of first repeaters 81 that transfer the time code from the time code generator 16, the plurality of second repeaters 82 that transfer the time codes corresponding to the auto-zero signal and the event detection signal is provided, so that it is possible to shorten the dead zone time during which the event detection cannot be performed.

Note that each pixel 21 in the pixel array section 12 is not necessarily required to output an auto-zero signal at the same timing, and for the pixel 21 in which an event has occurred, an auto-zero signal may be output when the event detection signal is held in the data holding section 62, and event detection may be started when the auto-zero signal is held in the data holding section 62. In this case, each pixel 21 in the pixel array section 12 asynchronously outputs an event detection signal and an auto-zero signal.

Figure 15:
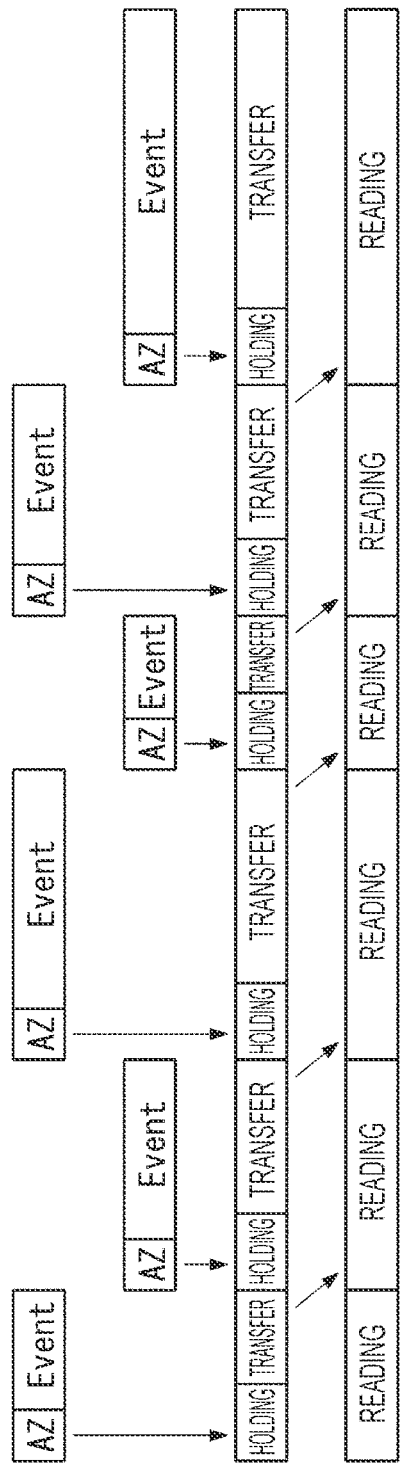
FIG. 15 is a timing chart in a case where an event detection signal and an auto-zero signal are output asynchronously.

FIG. 15 is a timing chart in a case where an event detection signal and an auto-zero signal are output asynchronously. In the case of FIG. 15, when the time code corresponding to the event detection signal is held in the data holding section 62, the auto-zero signal is output, and when the time code corresponding to the auto-zero signal is held in the data holding section 62, the event detection is started. Therefore, the length of the event detection period varies according to the event generation timing.

In the case of FIG. 15, while an effect that an event can be detected asynchronously with the frame period can be expected, a dead zone in which an event cannot be detected occurs until a transfer timing at which the time code corresponding to the event detection signal is transferred from the first repeater 81 to the second repeater 82 after the time code is held in the data holding section 62.

Figure 16:
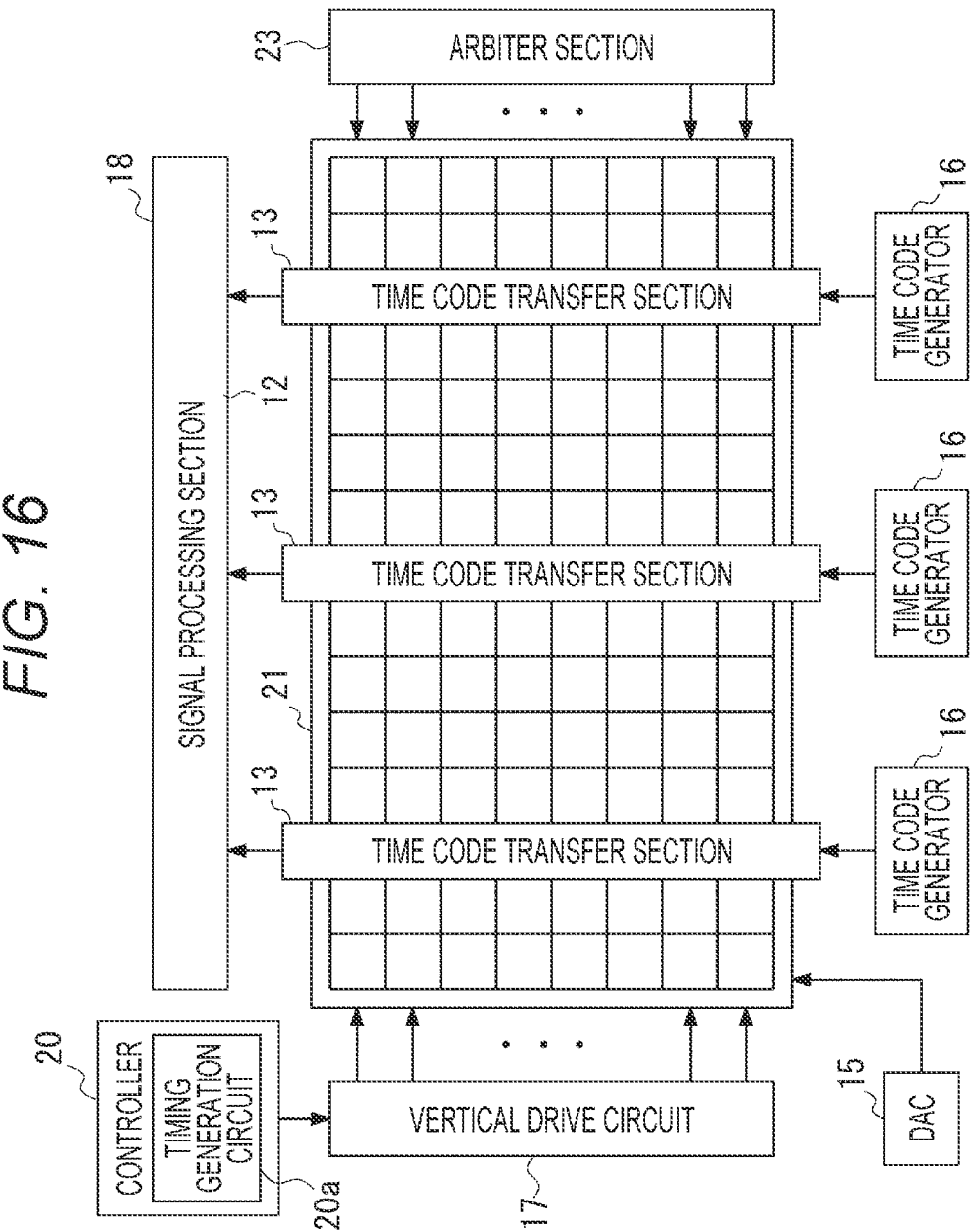
FIG. 16 is a block diagram depicting a schematic configuration of an imaging system including an arbiter section.

Since a plurality of events may occur simultaneously in a plurality of pixels 21, an arbiter section 23 may be provided as depicted in FIG. 16. The arbiter section 23 arbitrates a request for event occurrence from each of the plurality of pixels 21 and transmits a response based on the arbitration result to the pixel 21. The pixel 21 that has received the response from the arbiter section 23 transmits an event detection signal to the corresponding data holding section 62.

As described above, in the second embodiment, the first repeaters 81 in the plurality of stages and the second repeaters 82 in the plurality of stages are provided in the time code transfer section 13, the time code from the time code generator 16 is transferred in the first repeaters 81 in the plurality of stages, and the time code corresponding to the auto-zero signal and the event detection signal is transferred in the second repeaters 82 in the plurality of stages. Therefore, it is possible to simultaneously perform the transfer of the time code corresponding to the auto-zero signal and the event detection signal and the event detection in parallel, and it is possible to shorten the time of the dead zone in which the event detection cannot be performed.

Third Embodiment

In a third embodiment, a process of transferring the time code corresponding to the digital pixel 21 data AD-converted for every pixel 21 to the signal processing section 18 by the time code transfer section 13 and a process of transferring the time code corresponding to the auto-zero signal and the event detection signal to the signal processing section 18 by the time code transfer section 13 can be switched and performed.

Figure 17:
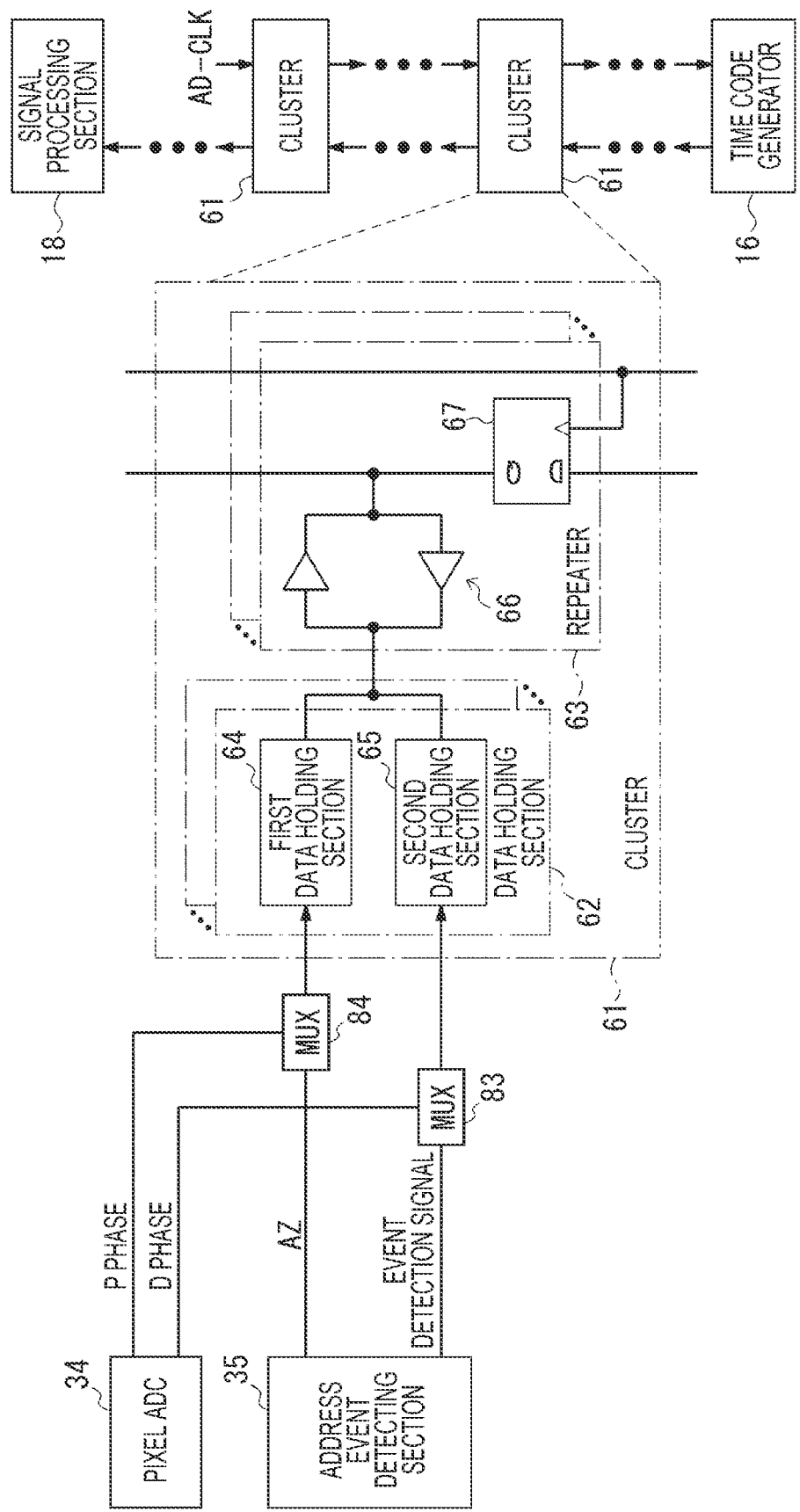
FIG. 17 is a block diagram depicting an internal configuration of a cluster and its peripheral circuits in a time code transfer section according to a third embodiment.

FIG. 17 is a block diagram depicting an internal configuration of a cluster 61 and its peripheral circuits in a time code transfer section 13 according to the third embodiment. The pixel 21 in FIG. 17 outputs the P-phase data and the D-phase data AD-converted by the ADC 34 in the pixel 21. The P-phase data is a digital pixel signal obtained by performing AD conversion on the reset level of the analog pixel signal. The D-phase data is a digital pixel signal obtained by performing AD conversion on the luminance signal level photoelectrically converted by the photodiode 22. The P-phase data and the D-phase data in this case are the output signal VCO of the positive feedback circuit 43 in FIG. 4. In the present embodiment, the data holding section 62 is provided instead of the data storage section 44 in FIG. 3.

As depicted in FIG. 17, a first selector (MUX) 83 and a second selector (MUX) 84 are connected to each cluster 61. The first selector 83 selects either the P-phase data or the auto-zero signal, and supplies the selected data to the first data holding section 64 in the data holding section 62. The second selector 84 selects one of the D-phase data and the event detection signal and supplies the selected data to the second data holding section 65 in the data holding section 62.

In a case where the luminance signal of each pixel 21 in the pixel array section 12 is transmitted to the signal processing section 18, the first selector 83 and the second selector 84 select the P-phase data and the D-phase data, respectively, and supply the P-phase data and the D-phase data to the first data holding section 64 and the second data holding section 65, respectively. The first data holding section 64 holds a time code corresponding to the P-phase data, and the second data holding section 65 holds a time code corresponding to the D-phase data.

In addition, in a case where the event detection result is transmitted to the signal processing section 18, the first selector 83 and the second selector 84 select an auto-zero signal or an event detection signal and supply the auto-zero signal or the event detection signal to the first data holding section 64 or the second data holding section 65. The first data holding section 64 holds a time code corresponding to an auto-zero signal, and the second data holding section 65 holds a time code corresponding to an event detection signal.

Figure 18:
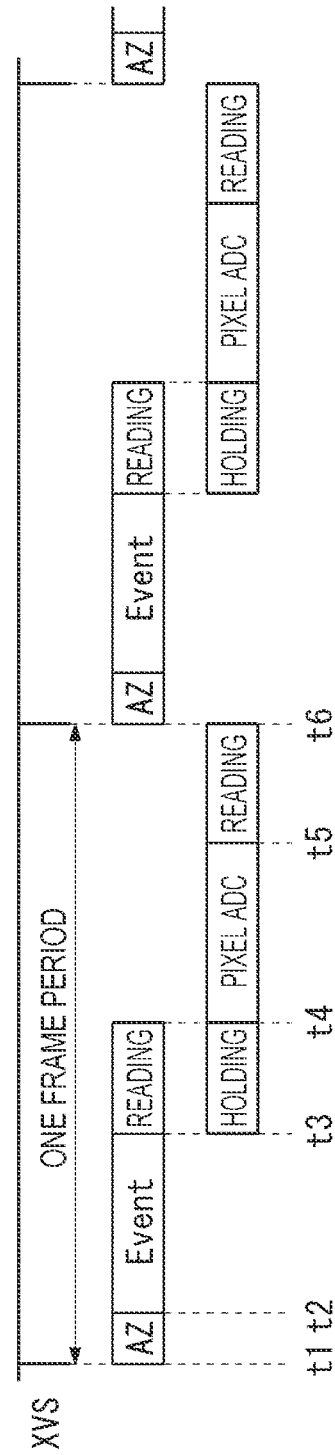

FIG. 18 is a timing chart depicting a timing at which the time code transfer section 13 according to the third embodiment transfers a time code or the like. In FIG. 18, time t1 to time t6 is one frame period. The holding and transfer of the time code corresponding to the auto-zero signal and the event detection signal and the holding and transfer of the time code corresponding to the luminance signal of each pixel 21 are performed within one frame period. More specifically, from time t1 to time t2, the data holding section

62 holds a time code corresponding to the auto-zero signal. From time t2 to time t3, the data holding section 62 holds a time code corresponding to the event detection signal. From time t3 to time t4, the time code transfer section 13 transfers the time codes corresponding to the auto-zero signal and the event detection signal held in the data holding section 62, and each pixel 21 in the pixel array section 12 is exposed. From time t4 to time t5, the data holding section 62 holds the time code corresponding to the P-phase data and the D-phase data of each pixel 21 in the pixel array section 12. From time t5 to time t6, the time code transfer section 13 transfers the time code corresponding to the luminance signal of each pixel 21 held in the data holding section 62.

In the time code transfer section 13 of FIG. 17, one repeater 63 is provided in each cluster 61, but the first repeater 81 and the second repeater 82 may be provided in each cluster 61 similarly to FIG. 15. In this case, while the first repeaters 81 in the plurality of stages transfer the time code from the time code generator 16, the second repeaters 82 in the plurality of stages transfer the time code corresponding to the auto-zero signal, the time code corresponding to the event detection signal, and the time code corresponding to the luminance signal (P-phase data and D-phase data) held in each data holding section 62.

Figure 19:
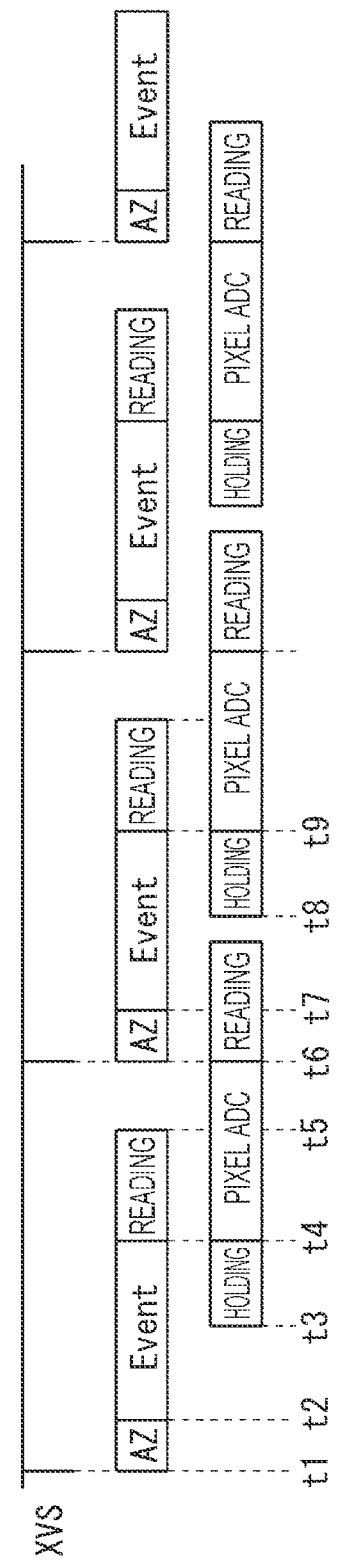
FIG. 19 is a timing chart in a case where a first repeater and a second repeater are provided in each cluster.

FIG. 19 is a timing chart in a case where the first repeater 81 and the second repeater 82 are provided in each cluster 61. Time t1 to t6 and time t6 to t12 are each one frame period. From time t1 to time t2, the data holding section 62 holds a time code corresponding to the auto-zero signal. From time t2 to time t4, the data holding section 62 holds a time code corresponding to the event detection signal. Each pixel 21 in the pixel array section 12 starts exposure from time t3 to time t4 during this process. From time t4 to time t5, the time code transfer section 13 transfers the time codes corresponding to the auto-zero signal and the event detection signal held in the data holding section 62. From time t4 to time t6 during this process, the data holding section 62 holds the time code corresponding to the P-phase data and the D-phase data of each pixel 21 in the pixel array section 12. From time t6 to time t11, similarly to from time t1 to time t5, time codes corresponding to the auto-zero signal and the event detection signal are held and transferred. From time t6 to time t8 during this process, the time code transfer section 13 transfers the time code corresponding to the P-phase data and the D-phase data held by the data holding section 62.

As can be seen from a comparison between FIGS. 18 and 19, by providing two types of cluster columns (the first repeater 81 and the second repeater 82), parallel processing can be performed, and the transfer efficiency of the time code can be increased.

As described above, in the third embodiment, not only the event detection result but also the time code corresponding to the luminance signal of each pixel 21 can be transferred using the plurality of clusters 61 in the time code transfer section 13. Therefore, the time code transfer section 13 can be effectively used. In addition, by providing a plurality of types of clusters 61 in the time code transfer section 13, transfer efficiency can be improved.

<Application Example of Technology According to Present Disclosure>

The technology according to the present disclosure can be applied to various products. Hereinafter, a more specific application example will be described. For example, the technology according to the present disclosure may be implemented as a distance measuring device mounted on any type of mobile body such as an automobile, an electric vehicle, a hybrid electric vehicle, a motorcycle, a bicycle, a personal mobility, an airplane, a drone, a ship, a robot, a construction machine, an agricultural machine (tractor), and the like.

[Mobile Body]

Figure 20:
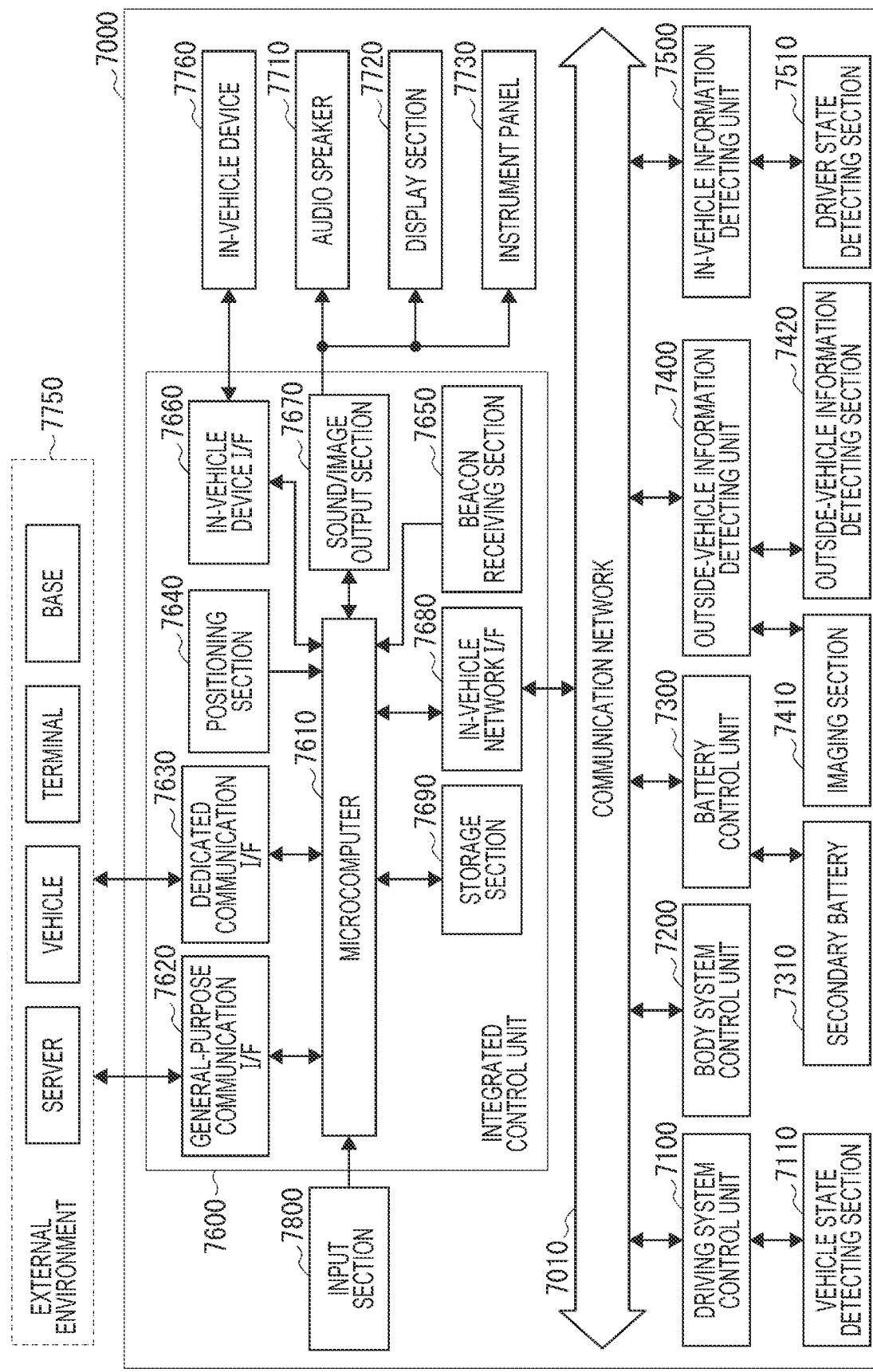
FIG. 20 is a block diagram depicting an example of schematic configuration of a vehicle control system as an example of a mobile body control system to which the technology according to an embodiment of the present disclosure can be applied.

FIG. 20 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 20, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units may be, for example, an in-vehicle communication network conforming to an arbitrary standard such as a controller area network (CAN), a local interconnect network (LIN), a local area network (LAN), or FlexRay (registered trademark), and the like.

Each control unit includes a microcomputer that performs arithmetic processing according to various programs, a storage section that stores programs executed by the microcomputer, parameters used for various calculations, or the like, and a drive circuit that drives various devices to be controlled. Each control unit includes a network I/F for communicating with other control units via the communication network 7010, and a communication I/F for communicating with devices, sensors, or the like inside and outside the vehicle by wired communication or wireless communication. In FIG. 20, as a functional configuration of the integrated control unit 7600, a microcomputer 7610, a general-purpose communication I/F 7620, a dedicated communication I/F 7630, a positioning section 7640, a beacon receiving section 7650, an in-vehicle device I/F 7660, a sound/image output section 7670, an in-vehicle network I/F 7680, and a storage section 7690 are depicted. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device such as an antilock brake system (ABS), an electronic stability control (ESC), or the like.

A vehicle state detecting section 7110 is connected to the driving system control unit 7100. The vehicle state detecting section 7110 includes, for example, at least one of a gyro sensor that detects an angular velocity of axial rotational motion of a vehicle body, an acceleration sensor that detects acceleration of the vehicle, or a sensor for detecting an operation amount of an accelerator pedal, an operation amount of a brake pedal, a steering angle of a steering wheel, an engine speed, a wheel rotation speed, or the like. The driving system control unit 7100 performs arithmetic processing using a signal input from the vehicle state detecting section 7110, and controls an internal combustion engine, a driving motor, an electric power steering device, a brake device, or the like.

The body system control unit 7200 controls the operation of various kinds of devices provided to a vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source of the driving motor, according to various programs. For example, information such as a battery temperature, a battery output voltage, a remaining capacity of a battery is input to the battery control unit 7300 from a battery device including the secondary battery 7310, or the like. The battery control unit 7300 performs arithmetic processing using these signals, and performs temperature adjustment control of the secondary battery 7310 or control of a cooling device or the like included in the battery device.

The outside-vehicle information detecting unit 7400 detects information about the outside of the vehicle including the vehicle control system 7000. For example, at least one of the imaging section 7410 or the outside-vehicle information detecting section 7420 is connected to the outside-vehicle information detecting unit 7400. The imaging section 7410 includes at least one of a time of flight (ToF) camera, a stereo camera, a monocular camera, an infrared camera, or other cameras. The outside-vehicle information detecting section 7420 includes, for example, at least one of an environment sensor for detecting current weather or climate, or a surrounding information detection sensor for detecting another vehicle, an obstacle, a pedestrian, or the like around the vehicle on which the vehicle control system 7000 is mounted.

The environment sensor may be, for example, at least one of a raindrop sensor that detects rainy weather, a fog sensor that detects fog, a sunshine sensor that detects a degree of sunshine, or a snow sensor that detects snowfall. The surrounding information detection sensor may be at least one of an ultrasonic sensor, a radar device, or a light detection and ranging, laser imaging detection and ranging (LIDAR) device. The imaging section 7410 and the outside-vehicle information detecting section 7420 may be provided as independent sensors or devices, or may be provided as a device in which a plurality of sensors or devices is integrated.

Figure 21:
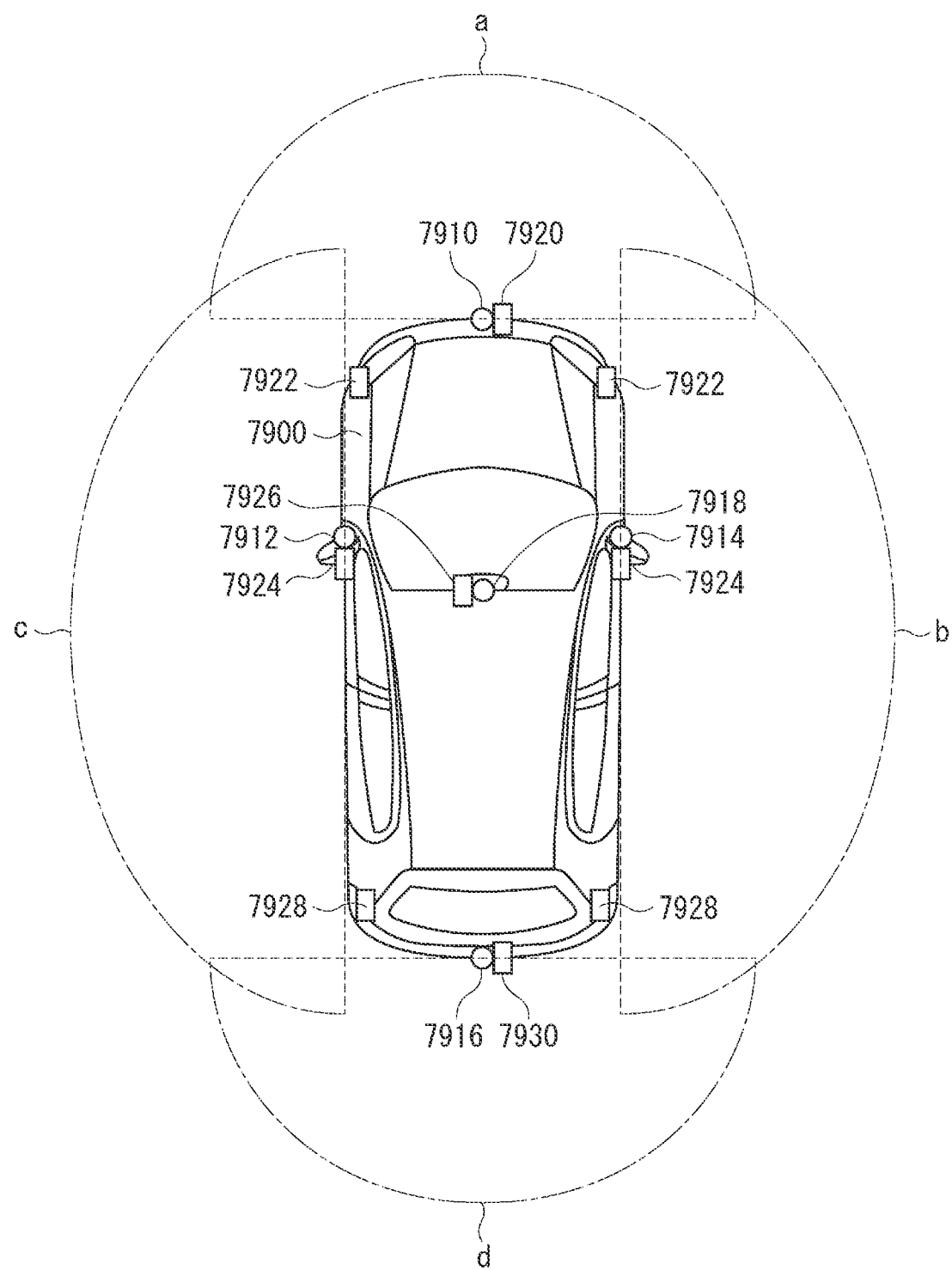
FIG. 21 is a diagram depicting an example of the installation position of the imaging section.

Here, FIG. 21 depicts an example of installation positions of the imaging section 7410 and the outside-vehicle information detecting section 7420. The imaging sections 7910, 7912, 7914, 7916, and 7918 are, for example, disposed at at least one position on a front nose, sideview mirrors, a rear bumper, and a back door of the vehicle 7900 as well as a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Note that FIG. 21 depicts an example of imaging ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above is obtained by superimposing image data imaged by the imaging sections 7910, 7912, 7914, and 7916, for example.

The outside-vehicle information detecting sections 7920, 7922, 7924, 7926, 7928, and 7930 provided at the front, rear, sides, corners, and the upper portion of the windshield in the vehicle interior of the vehicle 7900 may be, for example, ultrasonic sensors or radar devices. The outside-vehicle information detecting sections 7920, 7926, and 7930 provided at the front nose, the rear bumper, the back door, and the upper portion of the windshield in the vehicle interior of the vehicle 7900 may be, for example, LIDAR devices. These outside-vehicle information detecting sections 7920 to 7930 are mainly used for detecting a preceding vehicle, a pedestrian, an obstacle, or the like.

Returning to FIG. 20, the description will be continued. The outside-vehicle information detecting unit 7400 makes the imaging section 7410 image an image of the outside of the vehicle, and receives the imaged image data. In addition, the outside-vehicle information detecting unit 7400 receives detection information from the connected outside-vehicle information detecting section 7420. In a case where the outside-vehicle information detecting section 7420 is an ultrasonic sensor, a radar device, or a LIDAR device, the outside-vehicle information detecting unit 7400 transmits ultrasonic waves, electromagnetic waves, or the like, and receives information of received reflected waves. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing rainfall, fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may perform processing such as distortion correction, alignment, or the like, on the received image data, and combine image data imaged by different imaging sections 7410 to generate a bird's-eye image or a panoramic image. The outside-vehicle information detecting unit 7400 may perform viewpoint conversion processing using image data imaged by different imaging sections 7410.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biometric sensor that detects biometric information of the driver, a microphone that collects sound in the vehicle interior, or the like. The biometric sensor is provided, for example, on a seat surface, a steering wheel, or the like, and detects biometric information of an occupant sitting on a seat or a driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may perform processing such as noise canceling processing on the collected sound signal or the like.

The integrated control unit 7600 controls the overall operation in the vehicle control system 7000 according to various programs. An input section 7800 is connected to the integrated control unit 7600. The input section 7800 is implemented by, for example, a device such as a touch panel, a button, a microphone, a switch, a lever, or the like that can be operated by an occupant for input. Data obtained by performing sound recognition on the sound input by the microphone may be input to the integrated control unit 7600. The input section 7800 may be, for example, a remote control device using infrared rays or other radio waves, or an external connection device such as a mobile phone, a personal digital assistant (PDA), or the like corresponding to the operation of the vehicle control system 7000. The input section 7800 may be, for example, a camera, and in this case, the occupant can input information by gesture. Alternatively, data obtained by detecting a movement of a wearable device worn by an occupant may be input. Moreover, the input section 7800 may include, for example, an input control circuit or the like that generates an input signal on the basis of information input by the occupant or the like using the input section 7800 described above and outputs the input signal to the integrated control unit 7600. By operating the input section 7800, the occupant or the like inputs various data to the vehicle control system 7000 or instructs a processing operation.

The storage section 7690 may include a read only memory (ROM) that stores various programs to be executed by the microcomputer, and a random access memory (RAM) that stores various parameters, calculation results, sensor values, or the like. In addition, the storage section 7690 may be implemented by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various devices existing in the external environment 7750. The general-purpose communication I/F 7620 may implement a cellular communication protocol such as global system of mobile communications (GSM) (registered trademark), WiMAX, long term evolution (LTE), LTE-advanced (LTE-A), or the like, or another wireless communication protocol such as wireless LAN (also referred to as Wi-Fi (registered trademark)) or Bluetooth (registered trademark) or the like. The general-purpose communication I/F 7620 may be connected to a device (for example, an application server or a control server) existing on an external network (for example, the Internet, a cloud network, or a company-specific network) via, for example, a base station or an access point. In addition, the general-purpose communication I/F 7620 may be connected to a terminal (for example, a terminal of a driver, a pedestrian, or a store, or a machine type communication (MTC) terminal) existing in the vicinity of the vehicle using, for example, a peer to peer (P2P) technology.

The dedicated communication I/F 7630 is a communication I/F that supports a communication protocol formulated for use in a vehicle. For example, the dedicated communication I/F 7630 may implement a standard protocol such as wireless access in vehicle environment (WAVE) which is a combination of IEEE 802.11p of the lower layer and IEEE 1609 of the upper layer, dedicated short range communications (DSRC), or a cellular communication protocol. The dedicated communication I/F 7630 typically performs V2X communication which is a concept including one or more of vehicle to vehicle communication, vehicle to infrastructure communication, vehicle to home communication, and vehicle to pedestrian communication.

The positioning section 7640 receives, for example, a global navigation satellite system (GNSS) signal from a GNSS satellite (for example, a global positioning system (GPS) signal from a GPS satellite), executes positioning, and generates position information including the latitude, longitude, and altitude of the vehicle. Note that the positioning section 7640 may specify the current position by exchanging signals with a wireless access point, or may acquire the position information from a terminal such as a mobile phone, a PHS, or a smartphone having a positioning function.

The beacon receiving section 7650 receives, for example, radio waves or electromagnetic waves transmitted from a wireless station or the like installed on a road, and acquires information such as a current position, a traffic jam, a closed road, a required time, or the like. Note that the function of the beacon receiving section 7650 may be included in the dedicated communication I/F 7630 described above.

The in-vehicle device I/F 7660 is a communication interface that mediates connection between the microcomputer 7610 and various in-vehicle devices 7760 existing in the vehicle. The in-vehicle device I/F 7660 may establish wireless connection using a wireless communication protocol such as wireless LAN, Bluetooth (registered trademark), near field communication (NFC), or wireless USB (WUSB). In addition, the in-vehicle device I/F 7660 may establish wired connection such as universal serial bus (USB), high-definition multimedia interface (HDMI) (registered trademark), mobile high-definition link (MHL), or the like via a connection terminal (and, if necessary, a cable) not depicted. The in-vehicle device 7760 may include, for example, at least one of a mobile device or a wearable device possessed by an occupant, or an information device carried in or attached to the vehicle. In addition, the in-vehicle device 7760 may include a navigation device that searches for a route to an arbitrary destination. The in-vehicle device I/F 7660 exchanges a control signal or a data signal with these in-vehicle devices 7760.

The in-vehicle network I/F 7680 is an interface that mediates communication between the microcomputer 7610 and the communication network 7010. The in-vehicle network I/F 7680 transmits and receives signals and the like in accordance with a predetermined protocol supported by the communication network 7010.

The microcomputer 7610 of the integrated control unit 7600 controls the vehicle control system 7000 according to various programs on the basis of information acquired via at least one of the general-purpose communication I/F 7620, the dedicated communication I/F 7630, the positioning section 7640, the beacon receiving section 7650, the in-vehicle device I/F 7660, or the in-vehicle network I/F 7680. For example, the microcomputer 7610 may calculate a control target value of the driving force generating device, the steering mechanism, or the braking device on the basis of the acquired information regarding the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained.

The microcomputer 7610 may generate three-dimensional distance information between the vehicle and an object such as a surrounding structure, a person, or the like on the basis of information acquired via at least one of the general-purpose communication I/F 7620, the dedicated communication I/F 7630, the positioning section 7640, the beacon receiving section 7650, the in-vehicle device I/F 7660, or the in-vehicle network I/F 7680, and create local map information including surrounding information of the current position of the vehicle. In addition, the microcomputer 7610 may predict danger such as collision of the vehicle, approach of a pedestrian or the like, or entry into a closed road or the like on the basis of the acquired information, and generate a warning signal. The warning signal may be, for example, a signal for generating a warning sound or turning on a warning lamp.

The sound/image output section 7670 transmits an output signal of at least one of a sound and an image to an output device capable of visually or auditorily notifying an occupant of the vehicle or the outside of the vehicle of information. In the example of FIG. 20, an audio speaker 7710, a display section 7720, and an instrument panel 7730 are depicted as the output device. The display section 7720 may, for example, include at least one of an on-board display and a head-up display. The display section 7720 may have an augmented reality (AR) display function. The output device may be another device other than these devices, such as a wearable device such as a headphone, an eyeglass-type display worn by an occupant, or the like, a projector, a lamp, or the like. In a case where the output device is a display device, the display device visually displays results obtained by various processes performed by the microcomputer 7610 or information received from another control unit in various formats such as text, images, tables, graphs, and the like. In addition, in a case where the output device is a sound output device, the sound output device converts an audio signal including reproduced sound data, acoustic data, or the like into an analog signal and aurally outputs the analog signal.

Note that, in the example depicted in FIG. 20, at least two control units connected via the communication network 7010 may be integrated as one control unit. Alternatively, each control unit may include a plurality of control units. Moreover, the vehicle control system 7000 may include another control unit (not depicted). In addition, in the description described above, some or all of the functions performed by any of the control units may be provided to another control unit. That is, as long as information is transmitted and received via the communication network 7010, predetermined arithmetic processing may be performed by any control unit. Similarly, a sensor or a device connected to any of the control units may be connected to another control unit, and a plurality of control units may mutually transmit and receive detection information via the communication network 7010.

An example of the vehicle control system to which the technology according to the present disclosure can be applied has been described above. The technology according to the present disclosure can be applied to, for example, the imaging sections 7910, 7912, 7914, 7916, and 7918, the outside-vehicle information detecting sections 7920, 7922, 7924, 7926, 7928, and 7930, the driver state detecting section 7510, and the like, among the above-described configurations. Specifically, the imaging system 10 in FIG. 1 including the imaging device of the present disclosure can be applied to these imaging sections and detecting sections. Then, by applying the technology according to the present disclosure, the influence of a noise event such as sensor noise or the like can be mitigated, and the occurrence of a true event can be reliably and quickly sensed, so that safe vehicle traveling can be achieved.

Note that the present technology can have the following configurations.

(1) An imaging device including:
  a plurality of pixels each having a plurality of photoelectric conversion elements that photoelectrically converts incident light to generate an electric signal;
  a detecting section that outputs a detection signal in a case where an absolute value of a change amount of the electric signal in a pixel of the plurality of pixels exceeds a predetermined threshold;
  a signal processing section that performs predetermined signal processing on the basis of the detection signal output from the detecting section;
  an AZ output section that outputs an auto-zero signal for initializing the detecting section;
  a time code generator that outputs a time code changing at a predetermined cycle;
  a first holding circuit that holds the time code output from the time code generator when the auto-zero signal is output;
  a second holding circuit that holds the time code output from the time code generator when the detection signal is output; and
  a transfer section that transfers the time code held in the first holding circuit and the time code held in the second holding circuit to the signal processing section in association with each other.

(2) The imaging device according to (1),
  in which the first holding circuit holds the time code corresponding to the auto-zero signal for each of the plurality of pixels, and the second holding circuit holds the time code corresponding to the detection signal for a pixel that has output the detection signal among the plurality of pixels.

(3) The imaging device according to (1) or (2),
in which the second holding circuit holds data for the plurality of pixels by holding predetermined data for a pixel that does not output the detection signal.

(4) The imaging device according to (3),
in which the transfer section associates data for the plurality of pixels held by the first holding circuit with data for the plurality of pixels held by the second holding circuit, and sequentially transfers the data to the signal processing section for each pixel.

(5) The imaging device according to (3) or (4),
in which a period in which the time code corresponding to the auto-zero signals for the plurality of pixels is held in the first holding circuit, a period in which the time code corresponding to the detection signal for the plurality of pixels is held in the second holding circuit, and a period in which data held by the first holding circuit and the second holding circuit for the plurality of pixels is sequentially read for each pixel and transferred by the transfer section are sequentially repeated.

(6) The imaging device according to (5),
in which a period in which the time code corresponding to the auto-zero signal for the plurality of pixels is held in the first holding circuit, a period in which the time code corresponding to the detection signal for the plurality of pixels is held in the second holding circuit, and a period in which the data held by the first holding circuit and the second holding circuit for the plurality of pixels is sequentially read for each pixel and transferred by the transfer section are provided during one frame period in which data of the plurality of pixels is read.

(7) The imaging device according to any one of (1) to (6),
in which the transfer section includes clusters in a plurality of stages connected in series that transfer the time code generated by the time code generator and sequentially transfer data held by the first holding circuit and data held by the second holding circuit for each pixel, and
each of the clusters in the plurality of stages transfers the time code generated by the time code generator to a cluster in a subsequent stage or the signal processing section, and transfers the data held by the first holding circuit and the data held by the second holding circuit to the cluster in the subsequent stage or the signal processing section.

(8) The imaging device according to (7),
in which a cluster of the clusters in a first stage holds the time code output from the time code generator and holds data held by the first holding circuit corresponding and data held by the second holding circuit at a same timing, and
clusters of the clusters in second and subsequent stages transfer the time code sequentially transferred from the time code generator held in a cluster in a preceding stage to a cluster in a subsequent stage or the signal processing section, transfer the data held by the first holding circuit corresponding and the data held by the second holding circuit to the cluster in the subsequent stage or the signal processing section, and transfer data held by the cluster in the preceding stage to the cluster in the subsequent stage or the signal processing section.

(9) The imaging device according to any one of (1) to (6),
in which the transfer section includes:

first clusters in a plurality of stages that transfer the time code generated by the time code generator; and
second clusters in a plurality of stages that transfer data held by the first holding circuit and data held by the second holding circuit,
each of the first clusters in the plurality of stages transfers data held by the first holding circuit corresponding and data held by the second holding circuit to a second cluster of the second clusters corresponding, and
the signal processing section receives the time code output from a first cluster of the first clusters in a final stage and receives data output from a second cluster of the second clusters in a final stage.

(10) The imaging device according to (9),
in which a first cluster of the first clusters in a first stage holds the time code output from the time code generator,
a second cluster of the second clusters in a first stage holds data held by the first holding circuit corresponding and data held by the second holding circuit,
first clusters of the first clusters in second and subsequent stages hold the time code sequentially transferred from the time code generator held in a first cluster in a preceding stage, and
second clusters of the second clusters in second and subsequent stages transfer the data held by the first holding circuit corresponding and the data held by the second holding circuit corresponding to a second cluster of the second clusters in a subsequent stage or the signal processing section, and transfer data held by a second cluster in a preceding stage to the second cluster in the subsequent stage or the signal processing section.

(11) The imaging device according to (9) or (10),
in which a period in which the time code corresponding to the auto-zero signals for the plurality of pixels is held in the first holding circuit and a period in which the time code corresponding to the detection signal for the plurality of pixels is held in the second holding circuit are provided during a first frame period in which data of the plurality of pixels is read, and
each of the plurality of second clusters transfers, during a second frame period following the first frame period, data held for the plurality of pixels held in the first holding circuit and data held for the plurality of pixels held in the second holding circuit during the first frame period to a second cluster in a subsequent stage or the signal processing section.

(12) The imaging device according to (9) or (10),
in which detection processing of the detection signal for the plurality of pixels is started asynchronously with a frame period in which data of the plurality of pixels is read, the detection signal of a pixel is reset and the auto-zero signal is output after the time code corresponding to the detection signal for the pixel from which the detection signal is output is held in the second holding circuit, data held by the second holding circuit is transferred to a second cluster of the second clusters corresponding, and thereafter, the detection processing of the detection signal for the pixel is resumed after the time code corresponding to the auto-zero signal is held in the first holding circuit.

(13) The imaging device according to any one of (1) to (12),
in which each of the plurality of pixels includes an analog-digital converter that generates a first digital signal obtained by digitally converting a reset level of the electric signal generated by the plurality of photoelectric conversion elements and a second digital signal obtained by digitally converting the electric signal, the first holding circuit holds the time code corresponding to the auto-zero signal or the first digital signal, and the second holding circuit holds the time code corresponding to the detection signal or the second digital signal.

(14) The imaging device according to (13), further including:

a first selector that selects one of the auto-zero signal and the first digital signal and supplies the one selected to the first holding circuit; and a second selector that selects one of the detection signal and the second digital signal and supplies the one selected to the second holding circuit, in which the first selector and the second selector perform selection operation in conjunction with each other such that the second holding circuit holds the time code corresponding to the detection signal when the first holding circuit holds the time code corresponding to the auto-zero signal, and the second holding circuit holds the time code corresponding to the second digital signal when the first holding circuit holds the time code corresponding to the first digital signal.

(15) The imaging device according to any one of (1) to (14), in which the time code generator outputs the time code including a gray code.

(16) An imaging method including:

outputting a detection signal from a detecting section in a case where an absolute value of a change amount of an electric signal exceeds a predetermined threshold among a plurality of pixels each having a plurality of photoelectric conversion elements that photoelectrically converts incident light to generate the electric signal;

performing predetermined signal processing on the basis of the detection signal;

outputting an auto-zero signal for initializing the detecting section;

holding a time code output from a time code generator in a first holding circuit when the auto-zero signal is output;

holding the time code output from the time code generator in a second holding circuit when the detection signal is output; and transferring the time code held in the first holding circuit and the time code held in the second holding circuit to a signal processing section in association with each other.

Aspects of the present disclosure are not limited to the above-described individual embodiments, but include various modifications that can be conceived by those skilled in the art, and the effects of the present disclosure are not limited to the above-described contents. That is, various additions, modifications, and partial deletions can be made without departing from the conceptual idea and spirit of the present disclosure derived from the contents defined in the claims and equivalents thereof.

REFERENCE SIGNS LIST

1 Imaging device
2 Imaging system
3 Imaging lens
4 Recording section
5 Control section
6 Information processing section
11 Semiconductor substrate
12 Pixel array section
13 Time code transfer section
14 Pixel drive circuit
15 DAC
16 Time code generator
17 Vertical drive circuit
18 Signal processing section
20 Controller
21 Pixel
32 Light receiving section
33 Pixel circuit
34 ADC
35 Address event detecting section
36 Floating diffusion (FD)
37 Voltage comparison section
38 Initialization control section
41 Differential input circuit
42 Voltage conversion circuit
43 Positive feedback circuit
44 Data storage section
45 Logarithmic response section
46 Buffer
47 Differentiating circuit
48 Comparator
49 Current-voltage conversion section
51, 52 Delay section
53, 54 XOR gate
61 Cluster
62 Data holding section
63 Repeater
64 First data holding section
65 Second data holding section
66 Bidirectional buffer
67 D-F/F
68 Binary counter
69 Binary/gray converter
71 First semiconductor chip
72 Second semiconductor chip
73 Third semiconductor chip

The invention claimed is:

1. An imaging device comprising:

a plurality of pixels each having a plurality of photoelectric conversion elements that is configured to photoelectrically convert incident light to generate an electric signal;

a detecting section configured to output a detection signal in a case where an absolute value of a change amount of the electric signal in a pixel of the plurality of pixels exceeds a predetermined threshold;

a signal processing section configured to perform predetermined signal processing on a basis of the detection signal output from the detecting section;

an AZ output section configured to output an auto-zero signal to initialize the detecting section;

a time code generator configured to output a time code changing at a predetermined cycle;

a first holding circuit configured to hold the time code output from the time code generator when the auto-zero signal is output;

a second holding circuit configured to hold the time code output from the time code generator when the detection signal is output; and a transfer section configured to transfer the time code held in the first holding circuit and the time code held in the second holding circuit to the signal processing section in association with each other.

2. The imaging device according to claim 1, wherein
the first holding circuit is further configured to hold the time code corresponding to the auto-zero signal for each of the plurality of pixels, and
the second holding circuit is further configured to hold the time code corresponding to the detection signal for a pixel that has output the detection signal among the plurality of pixels.

3. The imaging device according to claim 1,
wherein the second holding circuit is further configured to hold data for the plurality of pixels by holding predetermined data for a pixel that does not output the detection signal.

4. The imaging device according to claim 3, wherein the transfer section is further configured to associate data for the plurality of pixels held by the first holding circuit with data for the plurality of pixels held by the second holding circuit, and sequentially transfer the data to the signal processing section for each pixel.

5. The imaging device according to claim 3,
wherein a period in which the time code corresponding to the auto-zero signals for the plurality of pixels is held in the first holding circuit, a period in which the time code corresponding to the detection signal for the plurality of pixels is held in the second holding circuit, and a period in which data held by the first holding circuit and the second holding circuit for the plurality of pixels is sequentially read for each pixel and transferred by the transfer section are sequentially repeated.

6. The imaging device according to claim 5,
wherein a period in which the time code corresponding to the auto-zero signal for the plurality of pixels is held in the first holding circuit, a period in which the time code corresponding to the detection signal for the plurality of pixels is held in the second holding circuit, and a period in which the data held by the first holding circuit and the second holding circuit for the plurality of pixels is sequentially read for each pixel and transferred by the transfer section are provided during one frame period in which data of the plurality of pixels is read.

7. The imaging device according to claim 1, wherein
the transfer section includes clusters in a plurality of stages connected in series that transfer the time code generated by the time code generator and sequentially transfer data held by the first holding circuit and data held by the second holding circuit for each pixel, and
each of the clusters in the plurality of stages is further configured to transfer the time code generated by the time code generator to a cluster in a subsequent stage or the signal processing section, and transfer the data held by the first holding circuit and the data held by the second holding circuit to the cluster in the subsequent stage or the signal processing section.

8. The imaging device according to claim 7, wherein
a cluster of the clusters in a first stage is further configured to hold the time code output from the time code generator and holds data held by the first holding circuit corresponding and data held by the second holding circuit at a same timing, and
clusters of the clusters in second and subsequent stages are configured to transfer the time code sequentially transferred from the time code generator held in a cluster in a preceding stage to a cluster in a subsequent stage or the signal processing section, transfer the data held by the first holding circuit corresponding and the data held by the second holding circuit to the cluster in the subsequent stage or the signal processing section, and transfer data held by the cluster in the preceding stage to the cluster in the subsequent stage or the signal processing section.

9. The imaging device according to claim 1, wherein
the transfer section includes:
first clusters in a plurality of stages configured to transfer the time code generated by the time code generator; and
second clusters in a plurality of stages configured to transfer data held by the first holding circuit and data held by the second holding circuit,
each of the first clusters in the plurality of stages is further configured to transfer data held by the first holding circuit corresponding and data held by the second holding circuit to a second cluster of the second clusters corresponding, and
the signal processing section is further configured to receive the time code output from a first cluster of the first clusters in a final stage and receives data output from a second cluster of the second clusters in a final stage.

10. The imaging device according to claim 9, wherein
a first cluster of the first clusters in a first stage is configured to hold the time code output from the time code generator,
a second cluster of the second clusters in a first stage is configured to hold data held by the first holding circuit corresponding and data held by the second holding circuit,
first clusters of the first clusters in second and subsequent stages are configured to hold the time code sequentially transferred from the time code generator held in a first cluster in a preceding stage, and
second clusters of the second clusters in second and subsequent stages are configured to transfer the data held by the first holding circuit corresponding and the data held by the second holding circuit corresponding to a second cluster of the second clusters in a subsequent stage or the signal processing section, and transfer data held by a second cluster in a preceding stage to the second cluster in the subsequent stage or the signal processing section.

11. The imaging device according to claim 9, wherein
a period in which the time code corresponding to the auto-zero signals for the plurality of pixels is held in the first holding circuit and a period in which the time code corresponding to the detection signal for the plurality of pixels is held in the second holding circuit are provided during a first frame period in which data of the plurality of pixels is read, and
each of the plurality of second clusters is further configured to transfer, during a second frame period following the first frame period, data held for the plurality of pixels held in the first holding circuit and data held for the plurality of pixels held in the second holding circuit during the first frame period to a second cluster in a subsequent stage or the signal processing section.

12. The imaging device according to claim 9,
wherein the detection of the detection signal for the plurality of pixels is started asynchronously with a frame period in which data of the plurality of pixels is read, the detection signal of a pixel is reset and the auto-zero signal is output after the time code corresponding to the detection signal for the pixel from which the detection signal is output is held in the second holding circuit, data held by the second holding circuit is transferred to a second cluster of the second clusters corresponding, and thereafter, the detection of the detection signal for the pixel is resumed after the time code corresponding to the auto-zero signal is held in the first holding circuit.

13. The imaging device according to claim 1, wherein
each of the plurality of pixels includes an analog-digital converter are further configured to generate a first digital signal obtained by digitally converting a reset level of the electric signal generated by the plurality of photoelectric conversion elements and a second digital signal obtained by digitally converting the electric signal,
the first holding circuit is further configured to hold the time code corresponding to the auto-zero signal or the first digital signal, and
the second holding circuit is further configured to hold the time code corresponding to the detection signal or the second digital signal.

14. The imaging device according to claim 13, further comprising:
   a first selector configured to select one of the auto-zero signal and the first digital signal and supplies the one selected to the first holding circuit; and
   a second selector configured to select one of the detection signal and the second digital signal and supplies the one selected to the second holding circuit,
   wherein the first selector and the second selector perform selection operation in conjunction with each other such that the second holding circuit holds the time code corresponding to the detection signal when the first holding circuit holds the time code corresponding to the auto-zero signal, and the second holding circuit holds the time code corresponding to the second digital signal when the first holding circuit holds the time code corresponding to the first digital signal.

15. The imaging device according to claim 1,
wherein the time code generator configured to output the time code including a gray code.

16. An imaging method, comprising:
outputting a detection signal from a detecting section in a case where an absolute value of a change amount of an electric signal exceeds a predetermined threshold among a plurality of pixels each having a plurality of photoelectric conversion elements that photoelectrically converts incident light to generate the electric signal;
performing predetermined signal processing on a basis of the detection signal;
outputting an auto-zero signal for initializing the detecting section;
holding a time code output from a time code generator in a first holding circuit when the auto-zero signal is output;
holding the time code output from the time code generator in a second holding circuit when the detection signal is output; and
transferring the time code held in the first holding circuit and the time code held in the second holding circuit to a signal processing section in association with each other.

* * * * *